(12) United States Patent
Takeda et al.

(10) Patent No.: US 12,082,200 B2
(45) Date of Patent: Sep. 3, 2024

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/321,314

(22) PCT Filed: Jul. 26, 2017

(86) PCT No.: PCT/JP2017/026951
§ 371 (c)(1),
(2) Date: Jan. 28, 2019

(87) PCT Pub. No.: WO2018/021370
PCT Pub. Date: Feb. 1, 2018

(65) Prior Publication Data
US 2019/0174531 A1     Jun. 6, 2019

(30) Foreign Application Priority Data

Jul. 29, 2016   (JP) ................. 2016-150066

(51) Int. Cl.
*H04W 72/23*   (2023.01)
*H04W 72/04*   (2023.01)
*H04W 72/0446* (2023.01)

(52) U.S. Cl.
CPC .......... *H04W 72/23* (2023.01); *H04W 72/04* (2013.01); *H04W 72/0446* (2013.01)

(58) Field of Classification Search
CPC ............. H04W 72/04; H04W 72/0446; H04W 72/1289

(Continued)

(56) References Cited

U.S. PATENT DOCUMENTS

2010/0238870 A1   9/2010   Mitra et al.
2011/0269492 A1*  11/2011  Wang ................... H04L 5/0064
                                              455/509

(Continued)

FOREIGN PATENT DOCUMENTS

JP   2009-540626 A    11/2009
JP   2014096658 A      5/2014
WO   2007/148710 A1   12/2007

OTHER PUBLICATIONS

3GPP TSG RAN WG1 Meeting #70 Qingdao, China, Aug. 13-17, 2012, R1-123863 Agenda item: 7.6.2; Source: Motorola Mobility; Title: Handling overlap of EPDCCH and POSCH Resources (Year: 2012).*

(Continued)

*Primary Examiner* — Nizam U Ahmed
(74) *Attorney, Agent, or Firm* — Osha Bergman Watanabe & Burton LLP

(57) ABSTRACT

The present invention is designed to communicate using data channel multiplexing methods that are suitable for the DL and/or the UL in future radio communication systems. According to the present invention, a user terminal has a transmitting/receiving section that transmits and/or receives a control channel, which is mapped to a candidate resource in a search space, and a data channel, which is at least time-division-multiplexed with the control channel, and a control section that controls transmission and/or receipt of the data channel based on at least one candidate resource in the search space.

6 Claims, 30 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2013/0163507 A1* | 6/2013 | Hoshino | H04B 7/155 370/315 |
| 2014/0092792 A1* | 4/2014 | Kim | H04L 5/0091 370/280 |
| 2015/0245322 A1* | 8/2015 | Shimezawa | H04L 5/0053 370/329 |
| 2017/0332365 A1* | 11/2017 | Lin | H04W 72/0406 |
| 2017/0367046 A1* | 12/2017 | Papasakellariou | H04W 72/0453 |
| 2019/0132837 A1* | 5/2019 | Yi | H04W 72/0413 |
| 2019/0141681 A1* | 5/2019 | Wang | H04W 72/23 |
| 2019/0173620 A1* | 6/2019 | Oh | H04L 1/1861 |
| 2021/0120534 A1 | 4/2021 | Mitra et al. | |

OTHER PUBLICATIONS

Ericsson: "sPDCCH search space design", 3GPP Draft; R1-165293, May 13, 2016 (May 13, 2016), XP051096743 (Year: 2016).*
3GPP TSG-RAN WG1 #85; R1-165293; Nanjing, P.R. China, May 23-27, 2016; Agenda Item: 6.2.10.1; Source: Ericsson; Title: sPDCCH search space design (Year: 2016).*
International Search Report issued in PCT/JP2017/026951 dated Oct. 17, 2017 (2 Pages).
Written Opinion of the International Searching Authority issued in PCT/JP2017/026951 dated Oct. 17, 2017 (4 Pages).
NEC Group, NTT DoCoMo; "Downlink ACK/NACK Mapping for E-UTRA"; TSG-RAN WG1 LTE AdHoc, R1-061884; Cannes, France, Jun. 27-30, 2006 (9 Pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).
Extended European Search Report issued in the counterpart European Patent Application No. 17834372.9, dated Feb. 20, 2020 (9 pages).
Panasonic; "Type 0 and type 2 PDSCH assignment on resources including ePDCCH allocation"; 3GPP TSG RAN WG1 Meeting #69, R1-122205; Prague, Czech Republic; May 21-25, 2012 (3 pages).
Nokia, Nokia Siemens Networks; "On the reuse of ePDCCH resources"; 3GPP TSG RAN WG1 Meeting #68bis, R1-122607; Prague, Czech Republic; May 21-25, 2012 (5 pages).
Motorola Mobility; "Handling overlap of EPDCCH and PDSCH Resources"; 3GPP TSG RAN WG1 Meeting #70, R1-123863; Qingdao, China; Aug. 13-17, 2012 (4 pages).
NTT DoCoMo, Inc.; "Dynamic resource sharing between DL data and control channels"; 3GPP TSG RAN WG1 Meeting #88, R1-1702834; Athens, Greece; Feb. 13-17, 2017 (7 pages).
Office Action issued in the counterpart European Patent Application No. 17834372.9, dated Jul. 23, 2020 (8 pages).
Office Action issued in Russian Application No. 2019103080/07; dated Jan. 13, 2021 (12 pages).
Office Action issued in the counterpart Japanese Patent Application No. 2018-530330, dated Jun. 15, 2021 (6 pages).
Office Action issued in the counterpart European Patent Application No. 17834372.9, dated Feb. 23, 2021 (8 pages).
Ericsson; "sPDCCH search space design"; 3GPP TSG-RAN WG1 #85, R1-165293; Nanjing, P.R. China, May 23-27, 2016 (6 pages).
Office Action issued in the counterpart Indian Patent Application No. 201917002868, dated Jul. 9, 2021 (5 pages).
Office Action issued in Chinese Application No. 201780047183.4 dated Nov. 18, 2022 (12 pages).
Office Action issued in European Application No. 17834372.9 dated Oct. 19, 2022 (7 pages).
Office Action issued in Chinese Application No. 201780047183.4 dated May 5, 2023 (14 pages).
Office Action issued in Chinese Application No. 201780047183.4 dated Aug. 30, 2023 (17 pages).

* cited by examiner

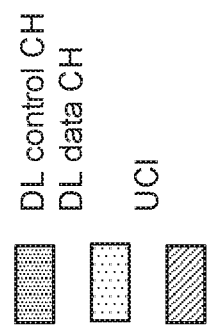 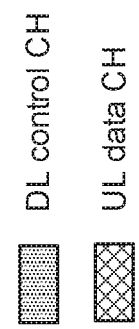
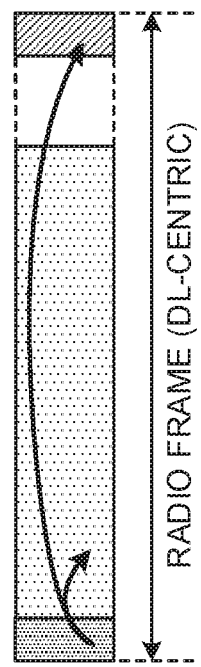
FIG. 1A
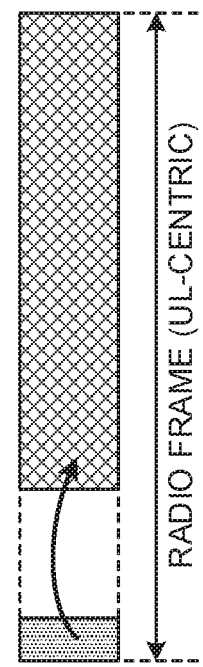
FIG. 1B

| DL-CCH candidate number | Mapping |
|---|---|
| 0 | A set of 36 REs within OFDM symbol #0 |
| 1 | A set of 36 REs within OFDM symbol #0 |
| 2 | A set of 72 REs within OFDM symbol #0 |
| 3 | A set of 72 REs within OFDM symbol #0 |
| 4 | A set of 144 REs within OFDM symbols #0 and #1 |
| 5 | A set of 144 REs within OFDM symbols #0 and #1 |
| 6 | A set of 216 REs within OFDM symbols #0 and #1 and #2 |
| 7 | A set of 216 REs within OFDM symbols #0 and #1 and #2 |

FIG. 5

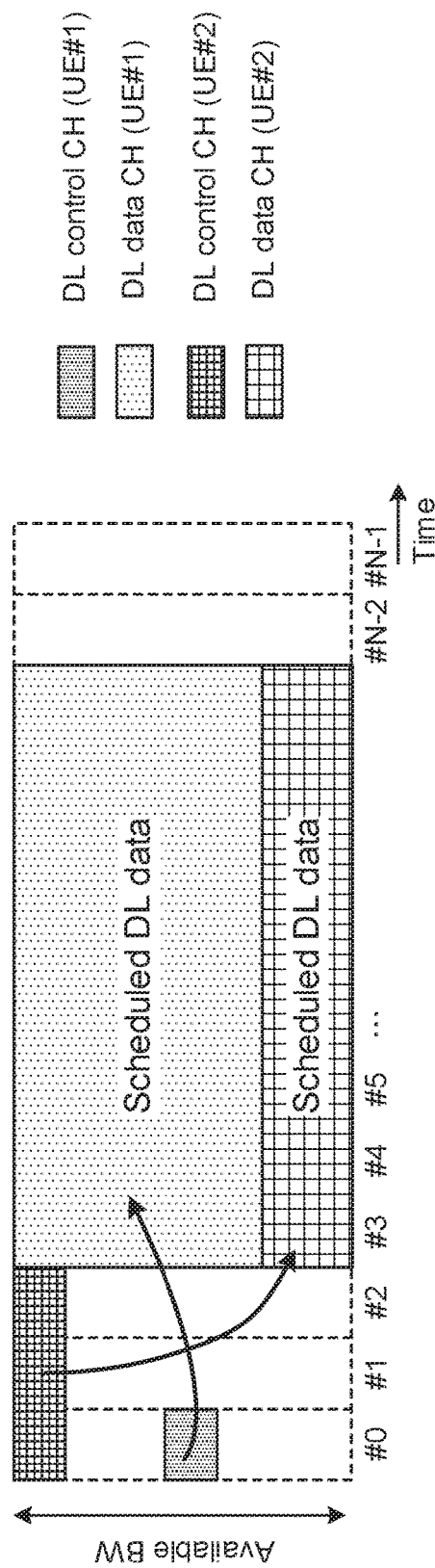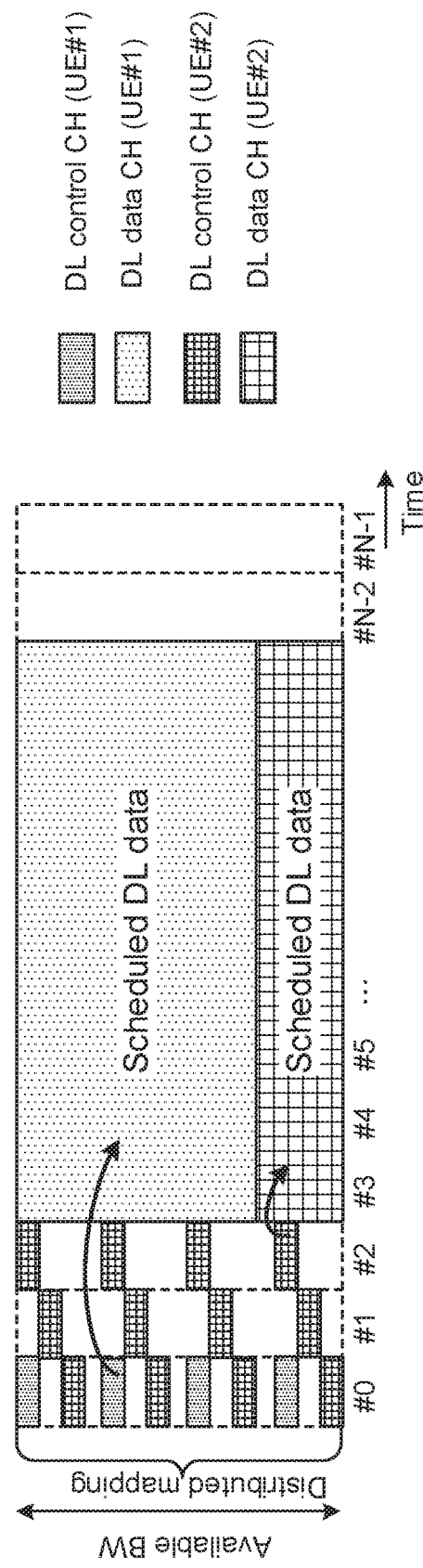

| DL-CCH candidate number | Mapping | Subcarrier-spacing |
|---|---|---|
| 0 | A set of 36 REs within OFDM symbol #0 | 15kHz |
| 1 | A set of 36 REs within OFDM symbol #0 | 15kHz |
| 2 | A set of 72 REs within OFDM symbol #0 | 15kHz |
| 3 | A set of 72 REs within OFDM symbol #0 | 15kHz |
| 4 | A set of 144 REs within OFDM symbols #0 and #1 | 30kHz |
| 5 | A set of 144 REs within OFDM symbols #0 and #1 | 30kHz |
| 6 | A set of 144 REs within OFDM symbols #0 - #3 | 60kHz |
| 7 | A set of 144 REs within OFDM symbols #0 - #3 | 60kHz |

FIG. 7

| UL-CCH candidate number | Mapping |
|---|---|
| 0 | A set of 36 REs within OFDM symbol #N-1 |
| 1 | A set of 36 REs within OFDM symbol #N-1 |
| 2 | A set of 72 REs within OFDM symbol #N-1 |
| 3 | A set of 72 REs within OFDM symbol #N-1 |
| 4 | A set of 144 REs within OFDM symbol #N-1 and #N-2 |
| 5 | A set of 144 REs within OFDM symbol #N-1 and #N-2 |
| 6 | A set of 216 REs within OFDM symbol #N-1 and #N-2 and #N-3 |
| 7 | A set of 216 REs within OFDM symbol #N-1 and #N-2 and #N-3 |

FIG. 13

| UL-CCH candidate number | Mapping | Subcarrier-spacing |
|---|---|---|
| 0 | A set of 36 REs within OFDM symbol #N-1 | 15kHz |
| 1 | A set of 36 REs within OFDM symbol #N-1 | 15kHz |
| 2 | A set of 72 REs within OFDM symbol #N-1 | 15kHz |
| 3 | A set of 72 REs within OFDM symbol #N-1 | 15kHz |
| 4 | A set of 144 REs within OFDM symbol #N-1 and #N-2 | 30kHz |
| 5 | A set of 144 REs within OFDM symbol #N-1 and #N-2 | 30kHz |
| 6 | A set of 144 REs within OFDM symbol #N-1 - #N-4 | 60kHz |
| 7 | A set of 144 REs within OFDM symbol #N-1 - #N-4 | 60kHz |

FIG. 14

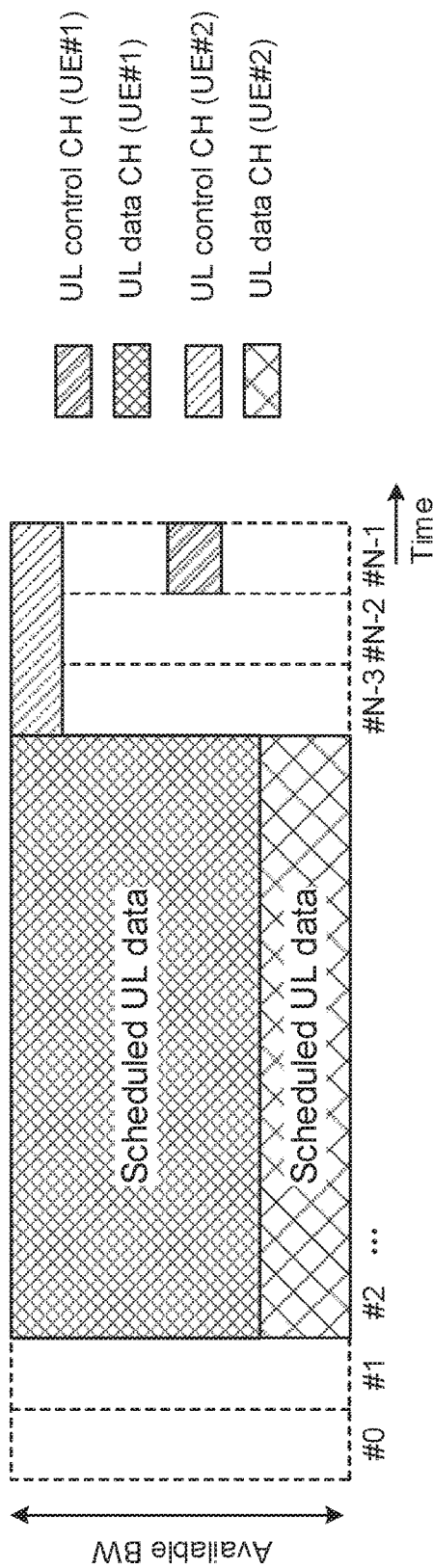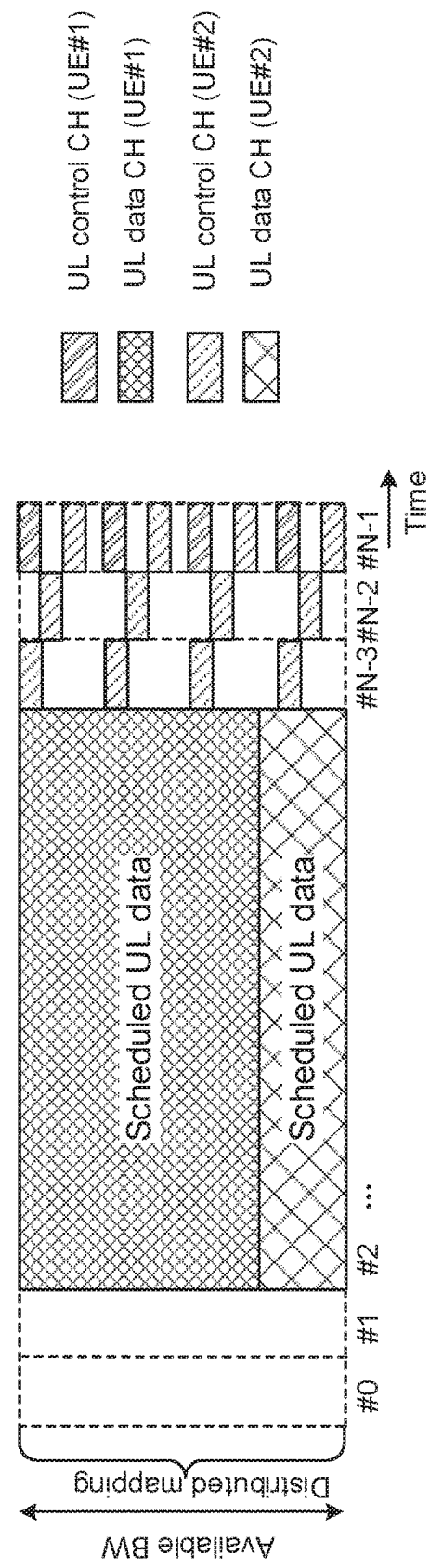

UL control CH (UE#1)   UL control CH (UE#2)
UL data CH (UE#1)      UL data CH (UE#2)

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE (referred to as, for example, "LTE-A (LTE-Advanced)," "FRA (Future Radio Access)," "4G," "5G," "5G+ (plus)," "NR (New RAT (New Radio Access Technology))," "LTE Rel. 14," "LTE Rel. 15 (or later versions)," and so on) are under study for the purpose of achieving further broadbandization and increased speed beyond LTE.

In existing LTE systems (for example, LTE Rel. 13 or earlier versions), downlink (DL) and/or uplink (UL) communication are carried out using transmission time intervals (TTIs) (also referred to as "subframes") of 1 ms. These 1-ms TTIs are the time unit for transmitting one channel-encoded data packet, and serve as the unit of processing in, for example, scheduling, link adaptation, retransmission control (HARQ-ACK (Hybrid Automatic Repeat reQuest-ACKnowledgement)) and so on.

Furthermore, in existing LTE systems, in a TTI for a certain carrier (which may be a CC (Component Carrier), a cell, and/or the like), a time field for a DL control channel (for example, PDCCH (Physical Downlink Control CHannel), and a time field for a DL data channel (for example, PDSCH (Physical Downlink Shared CHannel), which is scheduled by downlink control information (DCI) transmitted in the DL control channel, are provided. In the time field for a DL control channel, the DL control channel may be arranged throughout the system band.

Furthermore, in existing LTE systems, in a TTI for a given carrier, a UL control channel (for example, PUSCH (Physical Uplink Control CHannel)) for communicating uplink control information (UCI) is placed in fields at both ends of the system band, and a UL data channel (for example, PUSCH (Physical Uplink Shared CHannel)) is placed in fields apart from these edge fields.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, LTE Rel. 14 or 15, 5G, NR, etc.) are expected to realize low latency (also referred to as "latency reduction," etc.) and/or highly efficient control. However, when a clear distinction is drawn between the time field for a DL control channels (for example, PDCCH) and the time field for DL data channels (for example, PDSCH) within a TTI, as in existing LTE systems, unoccupied resources may be produced in the time field for a DL control channel, and there is a possibility that radio resources cannot be used effectively.

The present invention has been made in view of the above, and it is therefore an object of the present invention to provide a user terminal and a radio communication method, which allow communication using DL data channel multiplexing methods that are suitable for the DL and/or UL in future radio communication systems.

Solution to Problem

According to one aspect of the present invention, a user terminal has a transmitting/receiving section that transmits and/or receives a control channel, which is mapped to a candidate resource in a search space, and a data channel, which is at least time-division-multiplexed with the control channel, and a control section that controls transmission and/or receipt of the data channel based on at least one candidate resource in the search space.

Advantageous Effects of Invention

According to the present invention, it is possible to communicate using a data channel multiplexing method that is suitable for the DL and/or the UL in future radio communication systems.

BRIEF DESCRIPTION OF DRAWINGS

FIGS. 1A and 1B provide diagram to show examples of radio frame structures in future radio communication systems;

FIG. 5 is a diagram to show examples of DL control channel candidates according to the first aspect;

FIGS. 6A and 6B are diagrams to show examples of second mapping control of a DL data channel according to the first aspect;

FIG. 7 is a diagram to show other examples of DL control channel candidates according to the first aspect;

FIG. 13 is a diagram to show examples of UL control channel candidates according to a second aspect of the present invention;

FIG. 14 is a diagram to show examples of UL control channel candidates according to the second aspect;

FIGS. 18A and 18B are diagrams to show other examples of the second mapping control of UL data channels according to the second aspect;

DESCRIPTION OF EMBODIMENTS

Figure 2A:
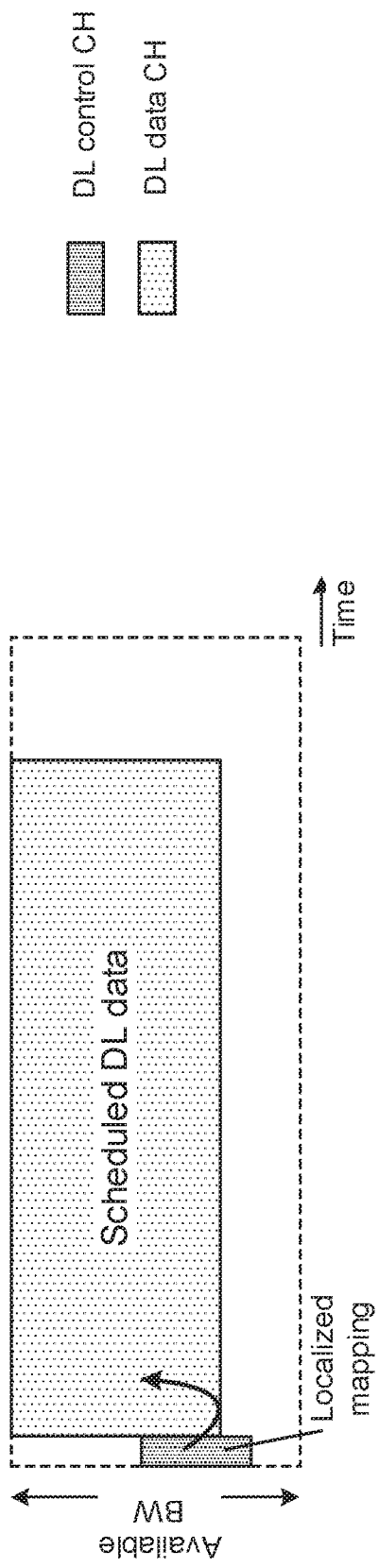
FIGS. 2A and 2B are diagrams to show examples of localized mapping of DL control channel candidates according to the first aspect of the present invention.

In existing LTE systems (for example, LTE Rel. 13 or earlier versions), a PDCCH is placed over the entire frequency band (system band) of a certain carrier (CC, cell, etc.), in a predetermined number of symbols (up to three symbols) at the top of a TTI of 1 ms.

In this TTI of 1 ms, in symbols following the symbols where the PDCCH is placed, a PDSCH and/or a PUSCH are placed in frequency resources (also referred to as, for example, "resource blocks (RBs)," "physical resource blocks (PRBs)," etc.) that are allocated by DCI transmitted via the PDCCH, in a resource block group (RBG) that is comprised of a predetermined number of RBs, and so on. As described above, in existing LTE systems, a time field for a PDCCH and a time field for a PDSCH are provided within a 1-ms TTI, and the PDCCH and the PDSCH are completely time-division-multiplexed (TDM (Time Division Multiplexing)).

Meanwhile, envisaging future radio communication systems (for example, LTE Rel. 14 or 15, 5G, NR etc.), radio frame structures for realizing low latency (also referred to as "latency reduction," and/or others) and high-efficiency control are under study.

For example, radio frames in future radio communication systems are expected to realize at least one of supporting TTIs having different time durations (TTI durations) than the 1-ms TTIs of existing LTE systems (for example, supporting TTIs shorter than 1 ms), shortening the time it takes to transmit retransmission control information, shortening the time it takes, after scheduling information for a UL data channel is received, to transmit the UL data channel, and so on.

Therefore, for future radio communication systems, a new radio frame structure, in which a control channel and a data channel are at least time-division-multiplexed in the DL and/or the UL, is under research.

FIG. 1 are diagrams to show examples of structures of radio frames (also referred to as "TTIs," "subframes," "scheduling units" and so on) in future radio communication systems. FIG. 1A shows a radio frame, in which DL communication is primarily performed (which is also referred to as "DL-centric," and/or the like), FIG. 1B shows a radio frame, in which UL communication is primarily performed (which is also referred to as "UL-centric" and/or the like).

For example, in the radio frame shown in FIG. 1A, a DL control channel, a DL data channel, and a UL control channel that communicates UCI, which carries A/Ns in response to the DL data channel, are at least time-division-multiplexed. In FIG. 1A, the DL control channel is placed in part of the frequency resources (for example, a predetermined number of RBs or RBGs) in the system band, and does not have to be placed over the whole system band. Thus, in the radio frame shown in FIG. 1A, a DL control channel and a DL data channel are time-division-multiplexed in a frequency band that constitutes at least part of the system band that is available to user terminals for use.

Note that DL reference signals (for example, sounding reference signals (also referred to as "channel state information reference signals (CSI-RSs)" and/or demodulation reference signals (DM-RSs)) may be mapped to a predetermined number of symbols where the DL data channel is mapped. Furthermore, at least one of A/Ns in response to the DL data channel, channel state information (CSI) and scheduling requests (SRs) may be contained in the UCI.

Meanwhile, in the radio frame shown in FIG. 1B, a DL control channel and a UL data channel are time-division-multiplexed. In FIG. 1B, too, the DL control channel is placed in part of the frequency resources (for example, a predetermined number of RBs or RBGs) in the system band, and does not have to be placed over the whole system band. Thus, in the radio frame shown in FIG. 1B, a DL control channel and a UL data channel are time-division-multiplexed in a frequency band that constitutes at least part of the system band that is available to user terminals for use.

Note that, although not shown in the drawing, a UL control channel may be time-division-multiplexed in the radio frame of FIG. 1B as well. While UL control channels are placed in fields at both ends of the system band in existing LTE systems, in the radio frame shown in FIG. 1B, UL control channels would not be limited to fields at both ends of the system band, and would only have to be placed in frequency bands that are available to user terminals for use.

Note that UL reference signals (for example, sounding reference signals (also referred to as "SRSs" and so on) and/or demodulation reference signals (DM-RSs)) may be mapped in a predetermined number of symbols where the UL data channel is mapped.

The radio frames shown in FIGS. 1A and 1B may be constituted by one TTI, or may be constituted by a number of TTIs. TTIs to constitute this radio frame may be 1 ms, shorter than 1 ms, or longer than 1 ms. Note that TTIs shorter than 1 ms may be referred to as "short TTIs," "short subframes," and so on. TTIs of 1 ms may be referred to as "normal TTIs," "long TTIs," and so on.

Furthermore, the time duration of symbols (symbol duration) in this radio frame may be the same as or different from that in existing LTE systems. Symbol duration and subcarrier spacing are reciprocal to each other, so that, if the symbol duration is shorter than in existing LTE systems, the subcarrier spacing will be greater than that of existing LTE systems, which is 15 kHz.

Furthermore, the number of symbols in this radio frame may be the same as the number of symbols in one TTI in existing LTE systems (for example, fourteen symbols if normal cyclic prefixes (CPs) are used, and twelve symbols if enhanced CPs are used), or may be different. Also, a CP of a predetermined length may or may not be appended to at least one symbol in the radio frame.

To use the above-described new radio frame structure, it is necessary to further investigate how to multiplex data channels in the DL and/or the UL. So, the present inventors have worked on a data channel multiplexing method that is suitable for the DL and/or the UL in future radio communication systems, and arrived at the present invention.

Now, the present embodiment will be described below in detail. Note that the present embodiment can employ the DL and/or UL radio frame structures that have been described with reference to FIGS. 1A and/or 1B. Note that, although the existing PDCCH will not be shown with the present embodiment, it is possible to place the PDCCH over the whole system band in a predetermined number of symbols at the top of a TTI. Also, according to the present embodiment, the bandwidth that is available to user terminals for use (available bandwidth (BW)) is smaller than the system band.

According to the present embodiment, a user terminal transmits and/or receives a control channel, which is mapped to candidate resources in a search space, and a data channel, which is at least time-division-multiplexed with the control channel. The user terminal has a control section that controls transmission and/or receipt of the data channel based on at least one candidate resource in the search space. The above control channel and data channel are a DL control channel and DL data channel in the first aspect, and a UL control channel and UL data channel in the second aspect.

According to the present embodiment, each candidate resource in the above search space may, as will be described later, be associated with at least one of the symbol to which the candidate resource is mapped, the number of resource elements (RE) to which the candidate resource is mapped, and the interval between subcarriers (subcarrier spacing) to which the candidate resource is mapped. Note that an RE refers to the minimum resource unit consisting of one subcarrier and one symbol. Instead of the number of REs, the number of resource element groups (REGs), which each include a plurality of REs, may be associated with each candidate resource.

(First Aspect)

According to the first aspect of the present invention, DL control channels and DL data channels are at least time-division-multiplexed. DL control channels are mapped to candidate resources in search spaces, and blind-detected by user terminals.

Now, according to the first aspect, DL control channels are mapped to candidate resources in search spaces. A user terminal identifies its search space based on a broadcast signal, higher layer signaling, physical radio parameters and so forth. The user terminal then blind-detects (decodes) one or more candidate resources that are included in its search space, and detects the DL control channel addressed to the user terminal. The user terminal may identify one search space per radio frame (subframe), or may identify two or more search spaces.

According to the first aspect below, each candidate resource in a search space will be referred to as a "DL control channel candidate." Each DL control channel candidate may be comprised of one or more resource units for control channels (for example, CCEs (Control Channel Elements), ECCEs (Enhanced Control Channel Elements) and so on, which hereinafter will be referred to as "CCEs"). A CCE consists of one or more resource units smaller than CCEs. The resource units that are smaller than CCEs may be REs, which have been mentioned earlier, or may be REGs (also referred to as "EREGs (Enhanced Resource Element Groups)" and so on).

One or more CCEs that constitute each DL control channel candidate may consist of localized (or continuous) REs or REGs (localized mapping), or consist of distributed (or discrete) REs or REGs (distributed mapping). Furthermore, the number of CCEs constituting each DL control channel candidate is, for example, one, two, four, eight, sixteen or thirty-two, and is also referred to as "aggregation level" and so on.

Now, with reference to FIG. 2 and FIG. 3, localized mapping and distributed mapping of DL control channel candidates will be described below in detail. Note that, in the examples of FIG. 2 and FIG. 3, a search space is comprised of four DL control channel candidates #0 to #3, each DL control channel candidate is comprised of one CCE, and one CCE is comprised of two REGs, but this is by no means limiting.

FIG. 2 are diagrams to show examples of localized mapping of DL control channel candidates according to the first aspect. As shown in FIG. 2A, in localized mapping, in a predetermined number of symbols in a TTI (for example, in a predetermined number of symbols at the top of a TTI), DL control channel candidates #0 to #3 may be mapped, in a localized manner, to part of the frequency band that is available for use.

Figure 2B:
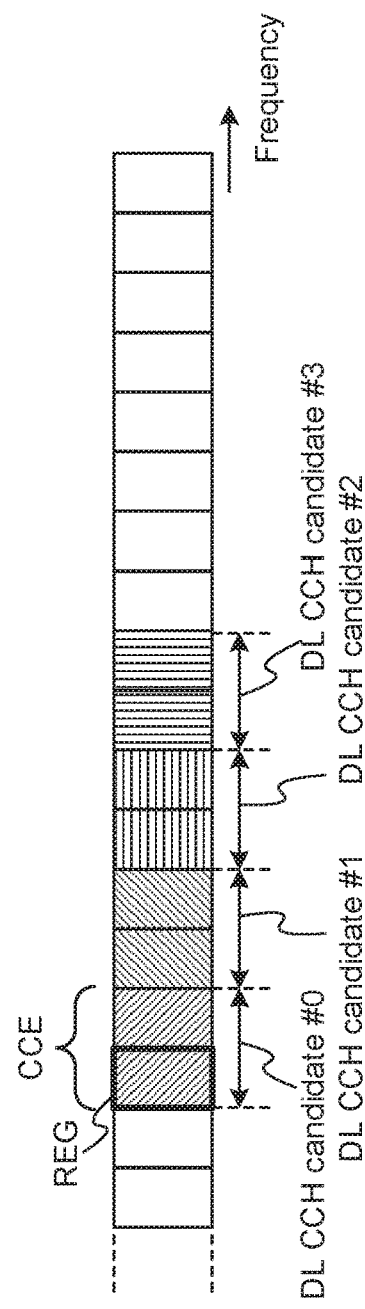

For example, as shown in FIG. 2B, each DL control channel candidate consists of one CCE, which includes two REGs that are placed in a localized manner (for example, two REGs each constituted by multiple REs within one RB). Note that, although, in FIG. 2B, DL control channel candidates #0 to #3 are placed in consecutive frequency resources, when localized mapping is used, as long as each DL control channel candidate is constituted by localized REs/REGs, DL control channel candidates #0 to #3 themselves need not be placed in consecutive frequency resources.

Figure 3A:
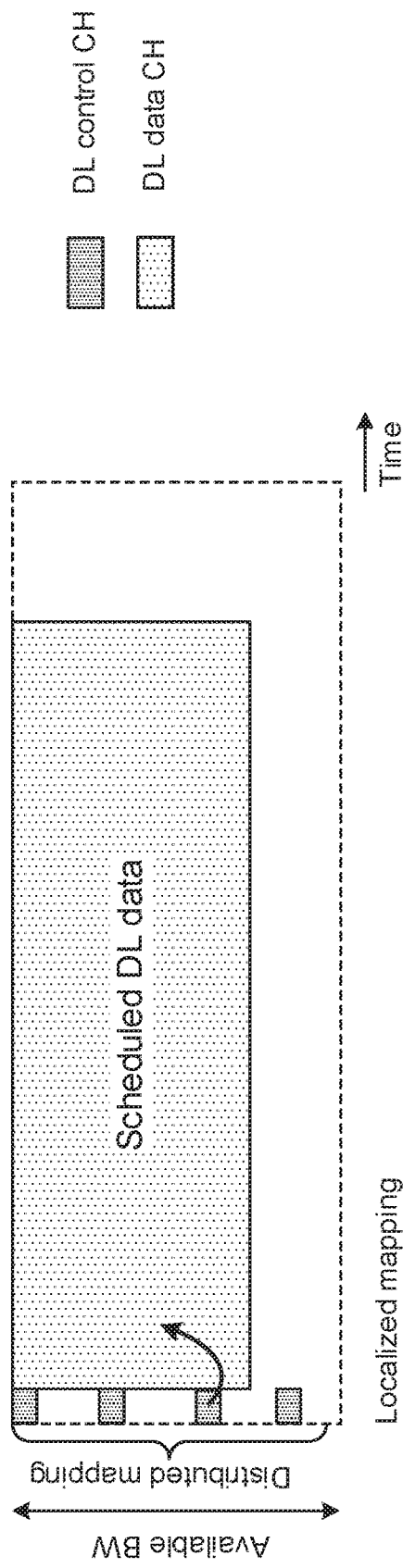
FIGS. 3A and 3B are diagrams to show examples of distributed mapping of DL control channel candidates according to the first aspect.
Figure 3B:
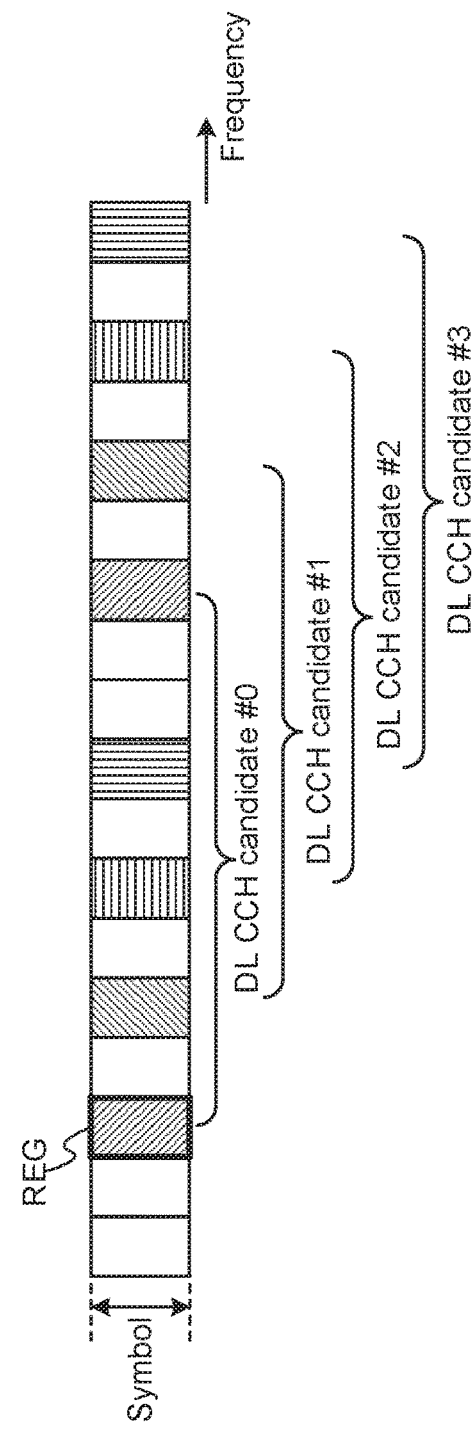

FIG. 3 are diagrams to show examples of distributed mapping of a DL control channel according to the first aspect. As shown in FIG. 3A, in distributed mapping, in a predetermined number of symbols in a TTI (for example, in a predetermined number of symbols at the top of a TTI), DL control channel candidates #0 to #3 may be mapped, in a distributed manner, to a frequency band that is available for use. For example, as shown in FIG. 3B, each DL control channel candidate consists of one CCE, which includes two REGs that are placed in a distributed manner in the bandwidth available for use.

Also, according to the first aspect, a DL data channel is mapped to frequency resources that are specified by DCI (DL assignment) communicated in DL control channels (for example, RBs or RBGs specified by the resource allocation indication field). Now, mapping control of DL data channels will be described in detail below.

<First Mapping Control>

According to first mapping control, a radio base station does not map a DL data channel to a predetermined number X of symbols at the top of a TTI, regardless of whether or not there is a DL control channel. A user terminal performs receiving processes (for example, demapping, demodulation, decoding and so on) for the DL data channel on assumption that no DL data channel is mapped in a predetermined number X of symbols, which are specified by the radio base station.

Here, the number of symbols, X, where no DL data channel is mapped, can take values in the range of 0≤X≤N, and N is the number of symbols included in the TTI (or radio frame, subframe, etc.). This number of symbols, X, may be a fixed value that is determined in advance. Alternatively, this number of symbols X may be explicitly configured through higher layer signaling and/or physical layer signaling. Alternatively, the number of symbols X may be determined implicitly in the user terminal based on other radio parameters, channel (for example, DL data channel) configuration information, and/or resource information. Also, X may take different values depending on radio frame indices (or subframe indices) and so forth.

FIG. 4 are diagrams to show examples of the first mapping control of DL data channels according to the first aspect. As shown in FIG. 4A, the number of symbols, X, where no DL data channel is mapped, may be 0. As shown in FIG. 4A, by allowing the DL data channel to be mapped from the first symbol in a TTI, the efficiency of the use of radio resources can be improved. In this case, the DL data channel may be subjected to cross-carrier scheduling with other carriers (CCs, cells, etc.), or may be scheduled by a DL control channel that is placed in frequency resources not allocated to the DL data channel.

Figure 4A:
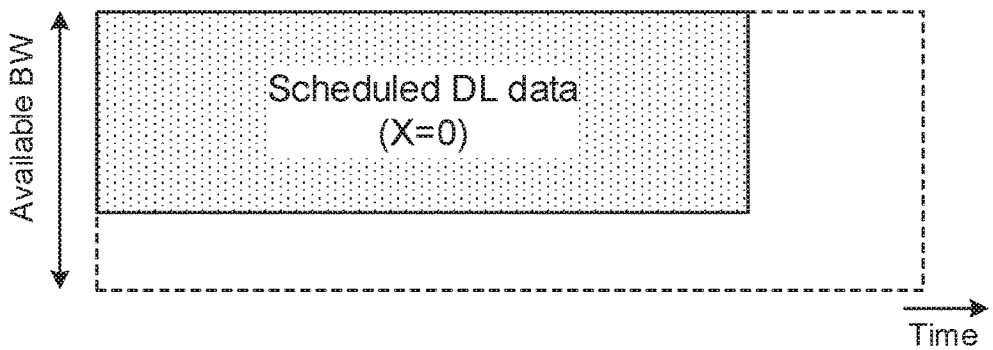
FIGS. 4A to 4D are diagrams to show examples of first mapping control of a DL data channel according to the first aspect.
Figure 4B:
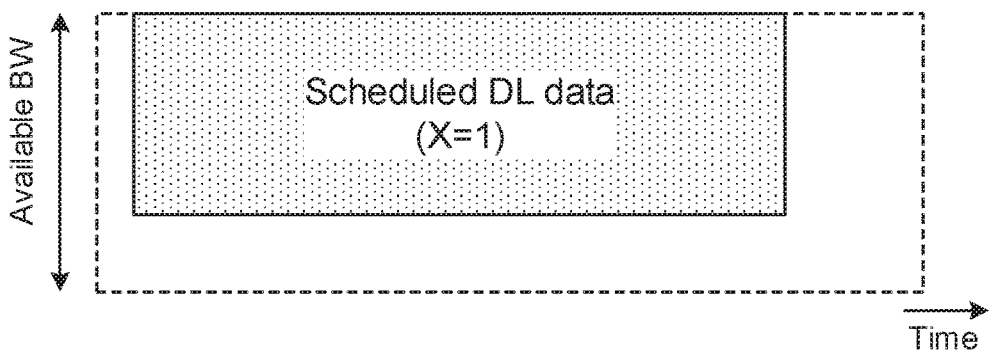
Figure 4C:
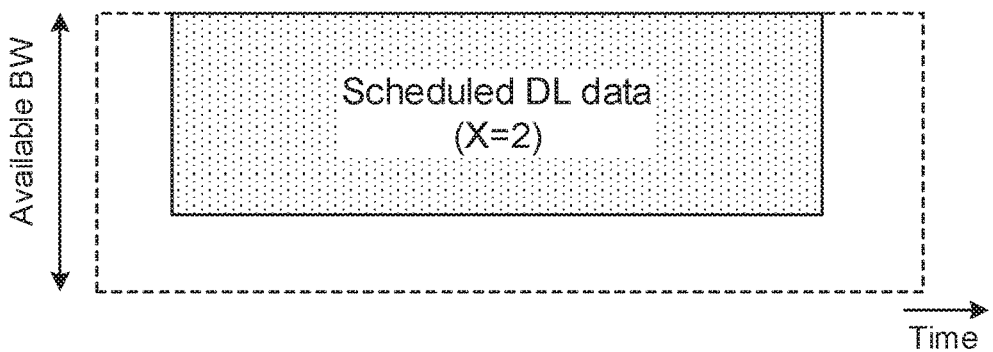
Figure 4D:
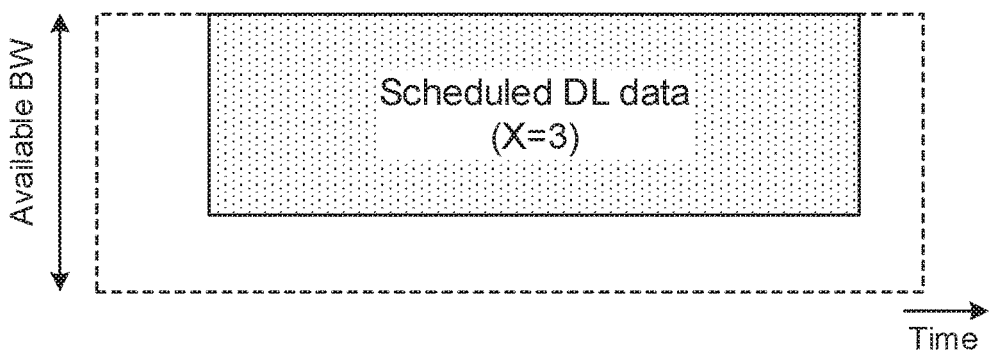

Alternatively, as shown in FIGS. 4B to 4D, the number of symbols, X, where no DL data channel is mapped, may be one, two or three. In this case, the DL data channel may be scheduled by a DL control channel that is placed in the first one, two or three symbols in the TTI.

According to the first mapping control, no DL data channel is mapped to a predetermined number X of symbols at the top of a TTI, so that it is possible to readily prevent collisions between the DL data channel addressed to a user terminal and DL control channels that are addressed to other user terminals and that the user terminal therefore fails to detect.

Also, in the first mapping control, within a TTI, a DL data channel is not placed in symbols located before the DL control channel that schedules this DL data channel. Therefore, there is no need to demodulate the DL data channel by going backward in time after the DL control channel is blind-decoded, so that it can be expected to save user terminals' memory and/or improve their processing speed.

<Second Mapping Control>

In second mapping control, in symbols where DL control channel candidates are mapped, the radio base station does not map a DL data channel that schedules a user terminal that executes blind decoding for a DL control channel on these DL control channel candidates. The user terminal performs receiving processes for the DL data channel (for example, demapping, demodulation, decoding and so on) on assumption that the DL data channel is not mapped to symbols where DL control channel candidates are mapped. By this means, according to the second mapping control, DL control channel candidates and the DL data channel are orthogonally multiplexed in time. Note that, if no DL data is scheduled for the user in a given radio frame (subframe), the DL data channel will not be mapped.

FIG. 5 is a diagram to show examples of DL control channel candidates according to the first aspect. Although an example case will be shown with FIG. 5 where a DL control channel's search space is comprised of eight DL control channel candidates, the number of DL control channel candidates to constitute the search space is not limited to eight. Furthermore, in FIG. 5, a TTI is comprised of N symbols #0 to #N−1.

For example, referring to FIG. 5, DL control channel candidates #0 and #1 are each mapped to 36 REs in symbol #0. In addition, DL control channel candidates #2 and #3 are each mapped to 72 REs in symbol #0. In addition, DL control channel candidates #4 and #5 are mapped to 144 REs that span symbols #0 and #1. In addition, DL control channel candidates #6 and #7 are mapped to 216 REs that span symbols #0 to #2. Note that DL control channel candidates #0 to #7 are mapped to at least partially different REs. Note that, as illustrated in FIG. 5, even when DL control channel candidates overlap among a number of user terminals, the REs where these DL control channel candidates are mapped may vary among the user terminals.

Thus, a number of DL control channel candidates, which are mapped to different numbers of REs and/or symbols, may be provided in a search space. For example, in FIG. 5, DL control channel candidates #2 and #3 are mapped to a larger number of REs than DL control channel candidates #0 and #1, in the same symbol #0. Thus, by increasing the number of mapping REs within the same symbol, the spreading factor of the same DCI increases (the coding rate goes down), so that DL control channel candidates #2 and #3 are more robust to poor channel conditions than DL control channel candidates #0 and #1.

Also, in FIG. 5, not only the number of REs where channel candidates #4 to #7 are mapped, but also the number of symbols where channel candidates #4 to #7 are mapped, increases compared to DL control channel candidates #0 to #3. Thus, by increasing the number of mapping symbols, the same DCI can be spread over different symbols, so that it is possible to improve the robustness to poor channel conditions.

Furthermore, a number of DL control channel candidates that are mapped to the same number of REs and symbols may be provided in a search space. For example, in FIG. 5, two DL control channel candidates to be mapped to the same number of REs and symbols are provided (for example, DL control channel candidates #0 and #1, #2 and #3, #4 and #5, and #6 and #7). Thus, by providing a number of DL control channel candidates to be mapped to the same number of REs and symbols, it is possible to select, dynamically, the resource to map a DL control channel to, or multiplex a number of user terminals having the same channel state in the same search space. Note that the REs where DL control channel candidates are mapped may vary per user terminal, regardless of whether the DL control channel candidates, such as those exemplified in FIG. 5, have a common structure or separate structures.

Furthermore, if, in FIG. 5, one CCE is comprised of 36 REs, it then follows that DL control channel candidates #0 and #1 are comprised of one CCE, DL control channel candidates #2 and #3 are comprised of two CCEs, DL control channel candidates #4 and #5 are comprised of four CCEs, and DL control channel candidates #6 and #7 are comprised of eight CCEs. Following this manner, one or more DL control channel candidates may be provided for every number of CCEs (that is, aggregation level) constituting a DL control channel candidate, in a search space.

The configuration (for example, at least one of mapping symbols, the number of symbols, the number of REs and the number of REGs) of DL control channel candidates #0 to #7 shown in FIG. 5 may be determined through at least one of a broadcast signal, higher layer signaling and physical layer signaling.

FIG. 6 are diagrams to show examples of second mapping control of DL data channels according to the first aspect. Note that FIG. 6 assume that one TTI consists of N symbols #0 to #N−1. Note that, in FIG. 6, no DL data channel is mapped to symbols #N−1 and #N−2, but DL data channel may be mapped here.

In addition, FIG. 6 assume that the search space shown in FIG. 5 is configured for user terminals #1 and #2. Here, assume that the DL control channel for user terminal #1 is mapped to DL control channel candidate #3 (72 REs in symbol #0) in FIG. 5, and the DL control channel for user terminal #2 is mapped to DL control channel candidate #6 (216 REs in symbols #0 to #2) in FIG. 5.

FIG. 6A shows an example of localized mapping. As shown in FIG. 6A, the DL control channel for user terminal #1 may be mapped to 72 localized REs in symbol #0 (for example, 72 REs in one RB). Furthermore, the DL control channel for user terminal #2 may be mapped to 216 localized REs in symbols #0 to #2 (for example, 216 REs in one RB).

FIG. 6B shows an example of distributed mapping. As shown in FIG. 6B, the DL control channel for user terminal #1 may be mapped to 72 REs that are distributed over the frequency band that is available for use, in symbol #0. Furthermore, the DL control channel for user terminal #2 may be mapped to 216 REs that are distributed over the frequency band that is available for use, in symbols #0 to #2.

Referring to FIGS. 6A and 6B, user terminals #1 and #2 each blind-decode DL control channel candidates #0 to #7 in the search space shown in FIG. 5. Detection of DL control channels based on blind decoding can be implemented by performing error detection by using CRC (Cyclic Redundancy Check) bits that are masked with different IDs (for example, C-RNTIs (Cell-Radio Network Temporary Identifiers)) per user terminal. User terminal #1 detects the DL control channel for user terminal #1 in DL control channel candidate #3, and performs receiving processes for the DL data channel based on this DL control channel. Meanwhile, user terminal #2 detects the DL control channel for user terminal #2 in DL control channel candidate #6, and performs receiving processes for the DL data channel based on this DL control channel.

In FIGS. 6A and 6B, user terminal #1 detects the DL control channel for this user terminal #1 in symbol #0, but nevertheless assumes that the DL data channel starts from symbol #3. This is because there is a possibility that DL control channels addressed to other user terminals (here, user terminal #2) may be mapped to symbols #1 and #2.

Thus, according to the second mapping control, a user terminal assumes that a DL data channel is not mapped to symbols where at least one DL control channel candidate is mapped (for example, symbols #0 to #2 when DL control channel candidates #0 to #7 shown in FIG. 5 are used). Therefore, even when DL control channels with varying numbers of symbols are allocated to a number of user terminals (here, #1 and #2) within the same TTI, the DL data channels' starting symbols can be readily aligned between these user terminals.

Furthermore, according to the second mapping control, in a TTI, no user terminal's DL data channel is placed in symbols located before the DL control channel that schedules that DL data channel. Therefore, there is no need to demodulate a DL data channel by going backward in time after the DL control channel is blind-decoded, so that it can be expected to save user terminals' memory and/or improve their processing speed.

Note that, in the second mapping control, symbols (and/or the number of symbols) where the DL control channel candidates to be blind-decoded are mapped may be determined based on a broadcast signal or information that is configured on a semi-static basis through higher layer signaling, may be determined based on information that is configured on a dynamic basis through physical layer signaling, or may be determined based on both of these pieces of information.

(Variations)

In the second mapping control, a number of DL control channel candidates that use different subcarrier spacings may be provided in a search space. To be more specific, in addition to the number of mapping symbols and/or REs, subcarrier spacing may be configured for each DL control channel candidate.

FIG. 7 is a diagram to show other examples of DL control channel candidates according to the first aspect. For example, in FIG. 7, DL control channel candidates #0 and #1 are each mapped to 36 REs in symbol #0 when the subcarrier spacing is 15 kHz. In addition, DL control channel candidates #2 and #3 are each mapped to 72 REs in symbol #0 when the subcarrier spacing is 15 kHz.

In addition, DL control channel candidates #4 and #5 are mapped to 144 REs, over symbols #0 and #1, when the subcarrier spacing is 30 kHz. Furthermore, DL control channel candidates #6 and #7 are mapped to 144 REs, over symbols #0 to #3, when the subcarrier spacing is 60 kHz. Note that DL control channel candidates #0 to #7 are all mapped to different REs.

Generally, subcarrier spacing and symbol duration are reciprocal to each other. Consequently, although the number of symbols varies between DL control channel candidates #0 to #3, #4 and #5, and #6 and #7 in FIG. 7, DL control channel candidates #0 to #7 can be provided in the same time duration by appropriately selecting the length of cyclic prefixes (CPs) or guard intervals (GIs) to attach to each symbol. Thus, in the search space shown in FIG. 7, DL control channel candidates #0 to #3 use symbol #0, the subcarrier spacing of which is 15 kHz, and the number of symbols to constitute DL control channel candidates #4 to #7, which use different subcarrier spacings, can be configured as to have same time duration as DL control channel candidates #0 to #3.

The structures of DL control channel candidates #0 to #7 (for example, at least one of mapping symbols, the number of symbols, the number of REs, the number of REGs, subcarrier spacing, and so on) shown in FIG. 7 may be determined through at least one of a broadcast signal, higher layer signaling and physical layer signaling.

FIG. 8 are diagrams to show other examples of the second mapping control of DL data channels according to the first aspect. Note that FIG. 8 assume that one TTI, in which the subcarrier spacing is 15 kHz, consists of N symbols #0 to #N−1. Symbols #0 to #3, in which the subcarrier spacing is 60 kHz, are shown in symbol #0, having a subcarrier spacing of 15 kHz.

FIG. 8 also assume that the search space shown in FIG. 7 is configured in user terminals #1 and #2. Here, assume that the DL control channel for user terminal #1 is mapped to DL control channel candidate #3 in FIG. 7 (72 REs in symbol #0 where the subcarrier spacing is 15 kHz), and the DL control channel for user terminal #2 is mapped to DL control channel candidate #6 in FIG. 7 (144 REs in symbols #0 to #3 where the subcarrier spacing is 60 kHz).

Figure 8A:
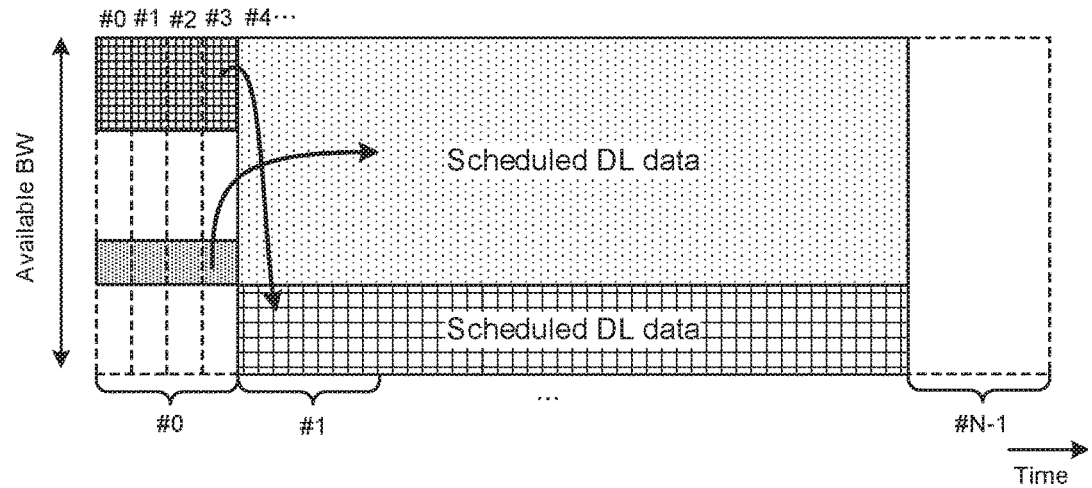
FIGS. 8A to 8C are diagrams to show other examples of the second mapping control of a DL data channel according to the first aspect.

When the localized mapping shown in FIG. 8A is executed, the DL control channel for user terminal #1 may be mapped to 72 localized REs in symbol #0, having a subcarrier spacing of 15 kHz. Meanwhile, the DL control channel for user terminal #2 may be mapped to 144 localized REs in symbols #0 to #3, where the subcarrier spacing is 60 kHz. As shown in FIG. 8A, the time duration of one symbol having a 15-kHz subcarrier spacing and the time duration of four symbols having a 60-kHz subcarrier spacing are equal, although the number of symbols mapped is different between the DL control channels of user terminals #1 and #2, the overall time duration is the same.

Figure 8B:
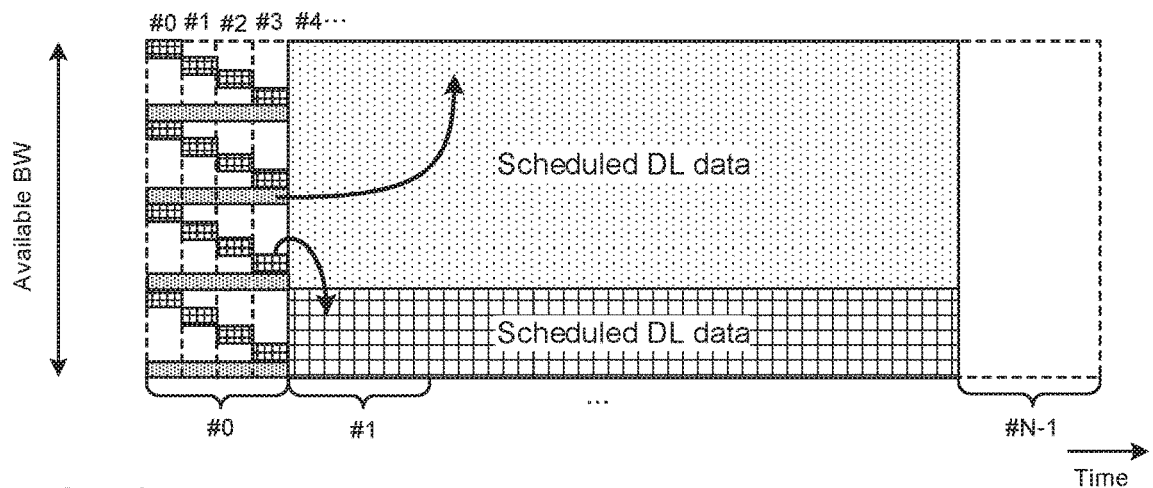

Also, in the distributed mapping shown in FIG. 8B, as in the localized mapping shown in FIG. 8A, the number of symbols mapped differs between the DL control channels of user terminals #1 and #2, but the overall time duration is the same.

Figure 8C:
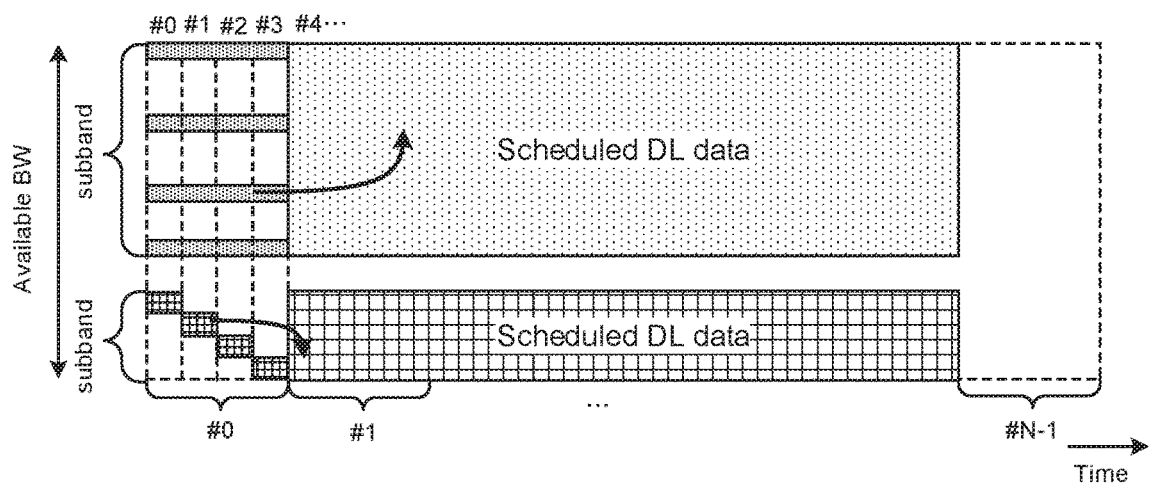

Note that, as shown in FIG. 8C, the frequency band that is available for use may be divided into two or more partial bands (also referred to as "subbands"), and DL control channels with different subcarrier spacings may be distributed and mapped in each subband. From the perspective of implementation of radio base stations or user terminals, if there are signals with varying subcarrier spacings, a guard band of a predetermined bandwidth, which depends on the subcarrier spacing of at least one signal, may have to be provided between these signals. In FIG. 8C, the number of guard bands can be reduced in such a case, and a frequency diversity effect by distributed mapping can be achieved.

Note that the bandwidth and/or the location of a predetermined partial band (subband) where a DL control channel of a given subcarrier spacing can be mapped may be configured via a broadcast signal, higher layer signaling or physical layer signaling.

Furthermore, assuming that DL data channels are transmitted/received after DL control channels, the bandwidth and/or the location of a predetermined partial band (subband) where a DL control channel of a given subcarrier spacing can be mapped may be the same as or different from the bandwidth and/or the location of a predetermined partial band (subband) where a DL data channel of the same subcarrier spacing can be scheduled. For example, as shown in FIG. 8C, when both are the same, it is possible to reduce the signaling overhead related to configuration of subbands. When both are different, it is possible to configure subbands for DL control channels and DL data channels, which may have different quality requirements and payloads, flexibly and independently, so that more flexible scheduling is made possible.

In FIGS. 8A, 8B and 8C, DL control channel candidates #0 to #7 are placed in symbol #0, where the subcarrier spacing is 15 kHz. Consequently, user terminal #1 assumes that no DL data channel is mapped to symbol #0, where the subcarrier spacing is 15 kHz. Also, user terminal #2 assumes that no DL data channel is mapped to symbols #0 to #3, in which the subcarrier spacing is 60 kHz, and which are therefore equivalent to symbol #0 having a subcarrier spacing of 15 kHz.

In the variations of the second mapping control, a number of DL control channel candidates having different subcarrier spacings are provided, so that, even when the number of symbols varies among these DL control channel candidates, the overall time duration can be made the same. Therefore, compared to the case shown in FIG. 6, the efficiency of the use of radio resources can be improved.

<Third Mapping Control>

In third mapping control, even in symbols where DL control channel candidates are mapped, the radio base station maps a DL data channel, which schedules a user terminal that executes blind decoding for a DL control channel on these DL control channel candidates, to frequency resources (for example, RBGs (subbands), RBs or REs) where no DL control channel candidates are mapped. Note that the configurations described with reference to FIG. 5 and FIG. 7 can be applied to the DL control channel candidates in this example of third mapping.

Note that, if no DL data is scheduled for this user terminal in a certain radio frame (subframe, TTI, etc.), or a DL data channel is scheduled for this user terminal, but the frequency resource where this DL data channel is scheduled is not a frequency resource without a DL control channel candidate mapped (that is, the frequency resource where the DL data channel is scheduled overlaps with a frequency resource where a DL control channel candidate is mapped), the DL data channel is not mapped to symbols where DL control channel candidates are mapped.

In symbols where DL control channel candidates are mapped, a user terminal assumes that no DL data channel is mapped to the frequency resource where the DL control channel candidates are mapped, and performs receiving processes for a DL data channel on assumption that the DL data channel is mapped to frequency resources where no DL control channel candidates are mapped. By this means, according to this example of third mapping, DL control channel candidates and DL data channels are orthogonally multiplexed not only in the time direction but also in the frequency direction.

FIG. 9 are diagrams to show examples of third mapping control of DL data channels according to the first aspect. FIG. 9 assume that a TTI consists of N symbols #0 to #N−1. The examples of FIG. 9 assume that a search space consists of four DL control channel candidates #0 to #3, each DL control channel candidate consists of one CCE, and one CCE consists of two localized REGs, but this is by no means limiting.

Figure 9A:
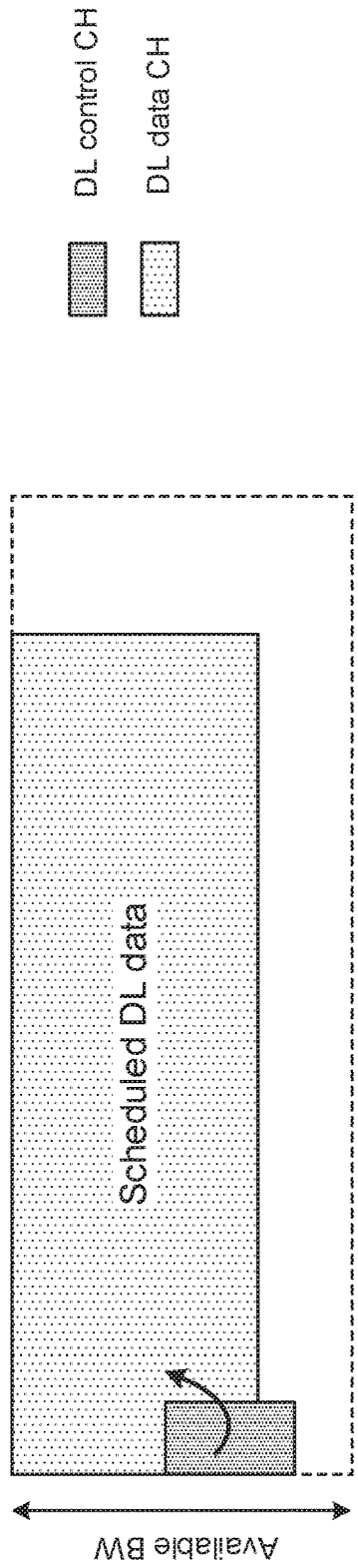
FIGS. 9A and 9B are diagrams to show examples of third mapping control of a DL data channel according to the first aspect.

As shown in FIG. 9A, when DL control channel candidates #0 to #3 are mapped, in a localized manner, to a predetermined number of symbols at the top of a TTI, it is possible to map DL data channels to frequency resources where DL control channel candidates #0 to #3 are not mapped.

Figure 9B:
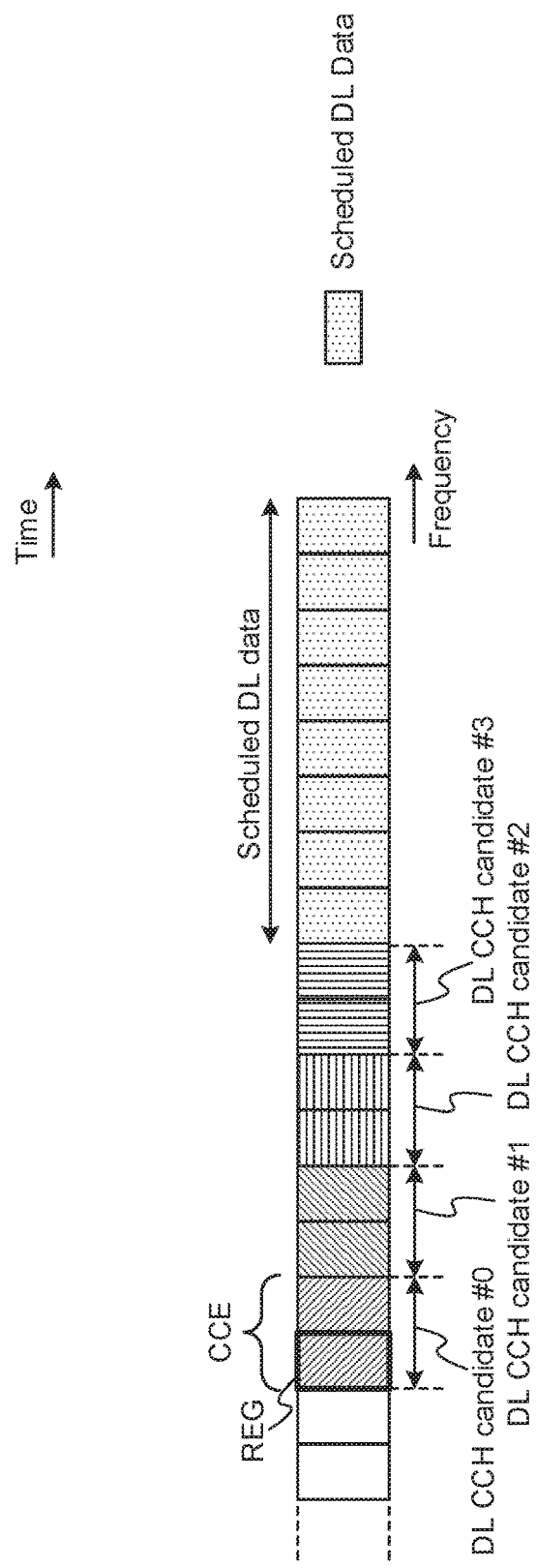

For example, when, as shown in FIG. 9B, one CCE, which includes two REGs that are placed in a localized manner, constitutes each DL control channel candidate, even in symbols where these DL control channel candidates are placed, DL data channels can be mapped to REGs (which may be REs, RBs or RBGs) that do not constitute the DL control channel candidates.

FIG. 10 are diagrams to show other examples of the third mapping control of DL data channels according to the first aspect. FIG. 10 assume that a TTI consists of N symbols #0 to #N−1. Also, FIG. 10 assume that, for example, a search space consists of four DL control channel candidates #0 to #3, each DL control channel candidate consists of one CCE, and one CCE consists of two REGs that are distributed over the bandwidth that is available for use, but this is by no means limiting.

Figure 10A:
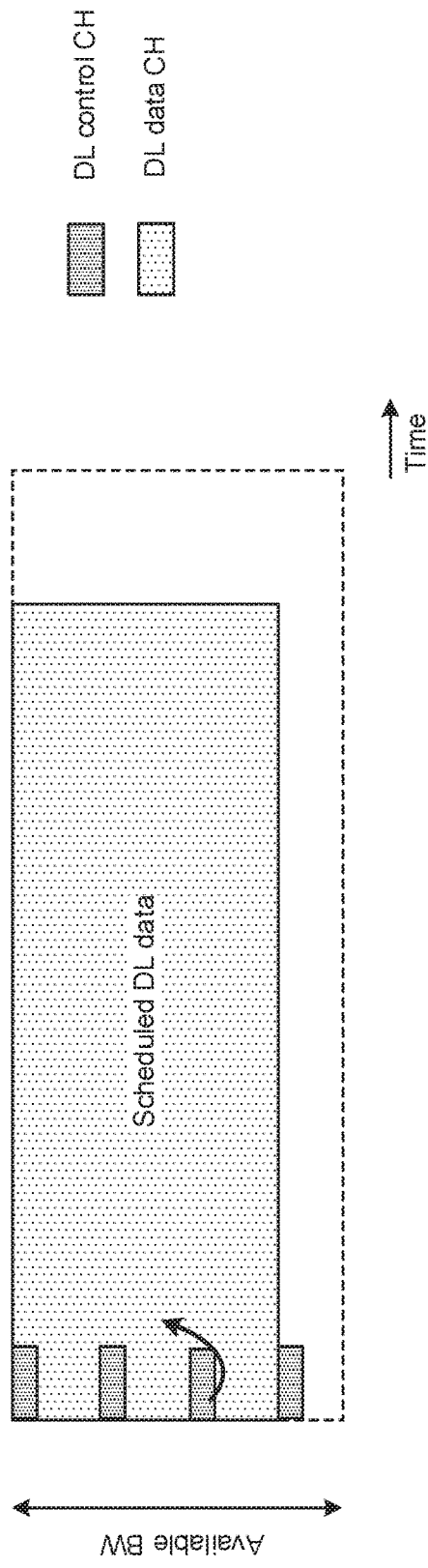
FIGS. 10A and 10B are diagrams to show other examples of the third mapping control of a DL data channel according to the first aspect.

As shown in FIG. 10A, when DL control channel candidates #0 to #3 are mapped, in a distributed manner, to a predetermined number of symbols at the top of a TTI, it is possible to map DL data channels to frequency resources where DL control channel candidates #0 to #3 are not mapped.

Figure 10B:
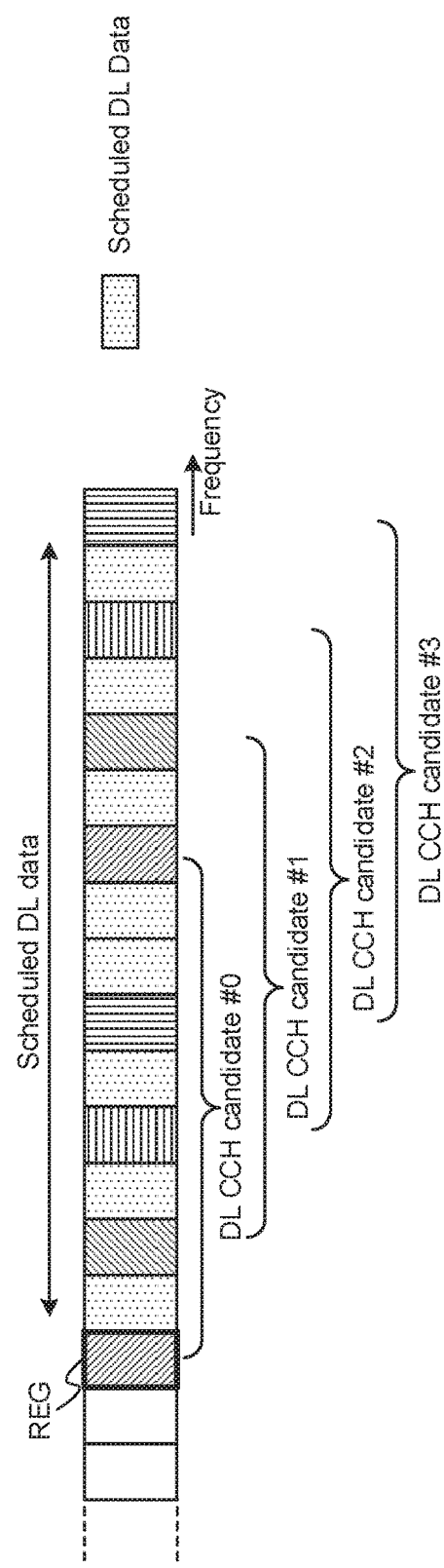

For example, when, as shown in FIG. 10B, one CCE, which includes two REGs that are placed in a distributed manner, constitutes each DL control channel candidate, even in symbols where these DL control channel candidates are placed, DL data channels can be mapped to REGs (which may be REs, RBs or RBGs) that do not constitute the DL control channel candidates.

According to the third mapping control, even in symbols where DL control channel candidates are mapped, DL data channels are mapped to frequency resources (for example, RBGs (subbands), RBs or REs) where no DL control channel candidates are mapped. Consequently, the efficiency of the use of radio resources can be improved, and improved demodulation performance, as well as improved throughput, can be achieved.

<Fourth Mapping Control>

In fourth mapping control, even in symbols where DL control channel candidates are mapped, the radio base station maps a DL data channel, which schedules a user terminal that executes blind decoding for a DL control channel on these DL control channel candidates, to one or more frequency resources (for example, RBGs (subbands), RBs or REs) where DL control channel candidates are not actually mapped. Note that the configurations described with reference to FIG. 5 and FIG. 7 can be applied to the DL control channel candidates in this example of third mapping.

Note that, if no DL data is scheduled for this user terminal in a certain radio frame (subframe), or a DL data channel is scheduled for this user terminal, but the frequency resource where this DL data channel is scheduled is not a frequency resource without a DL control channel candidate mapped (that is, the frequency resource where the DL data channel is scheduled overlaps with a frequency resource where a DL control channel candidate is mapped), the DL data channel is not mapped to symbols where DL control channel candidates are mapped.

The user terminal assumes that no DL data channel is mapped to the frequency resource where the DL control channel (downlink control information (DCI)) addressed to this user terminal is detected, and performs receiving processes for a DL data channel on assumption that the DL data channel is mapped to frequency resources where this DL control channel is not detected. By this means, according to this example of fourth mapping, DL control channel candidates and DL data channels are orthogonally multiplexed not only in the time direction but also in the frequency direction.

To be more specific, the user terminal assumes that, among the DL control channel candidates where blind detection has been conducted, DL data channels are also mapped to frequency resources (for example, RBGs, RBs or REs) where the DL control channel is not mapped.

FIG. 11 are diagrams to show examples of fourth mapping control of DL data channels according to the first aspect. FIG. 11 assume that a TTI consists of N symbols #0 to #N−1. Also, the examples of FIG. 11 assume that a search space consists of four DL control channel candidates #0 to #3, each DL control channel candidate consists of one CCE, and one CCE consists of two localized REGs, but this is by no means limiting.

Figure 11A:
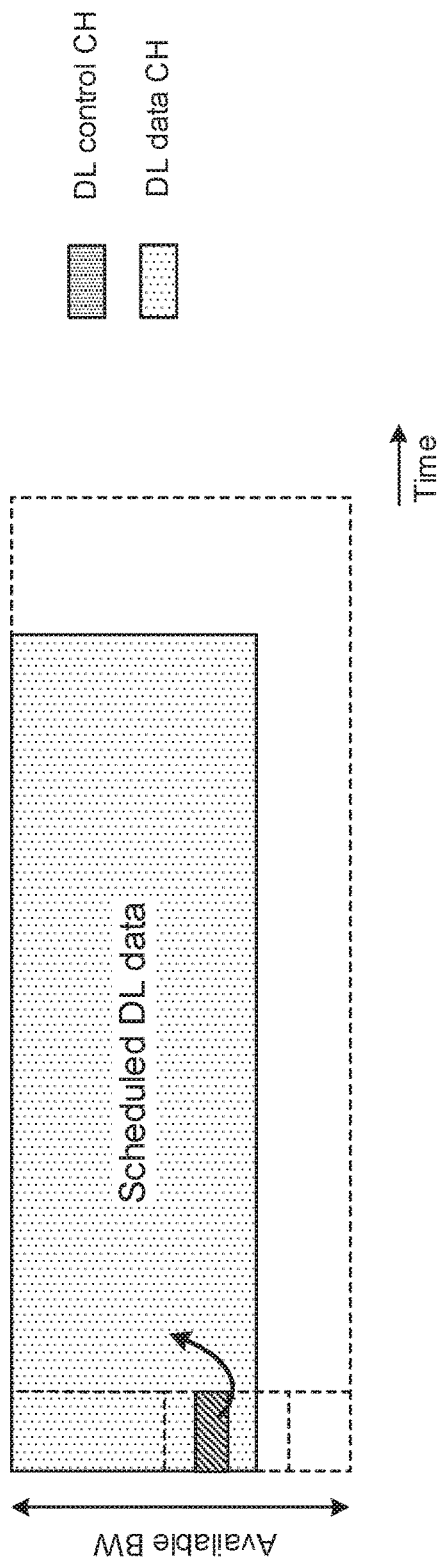
FIGS. 11A and 11B are diagrams to show examples of fourth mapping control of a DL data channel according to the first aspect.

As shown in FIG. 11A, when DL control channel candidates #0 to #3 are mapped, in a localized manner, to a predetermined number of symbols at the top of a TTI, and yet the DL control channel addressed to the user terminal is mapped only to part of the DL control channel candidates (for example, DL control channel candidate #2), DL data channels can be mapped to frequency resources where this DL control channel is not mapped.

Figure 11B:
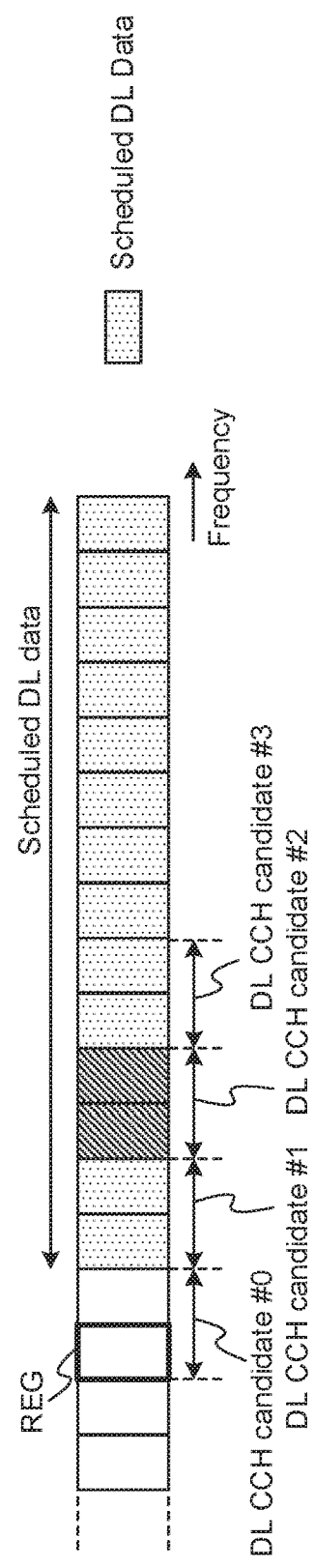

For example, as shown in FIG. 11B, if each DL control channel candidate consists of one CCE that includes two REGs that are placed in a localized manner, it is possible to map DL data channels to REGs other than the REGs constituting DL control channel candidate #2 where the DL control channel addressed to the user terminal is mapped. In FIG. 11B, in addition to REGs (which may be REs, RBs or RBGs) that do not constitute DL control channel candidates, DL data channels are mapped to the REGs constituting DL control channel candidates #1 and #3 and part of the REGs constituting DL control channel candidate #0.

FIG. 12 are diagrams to show other examples of the third mapping control according to the first aspect. FIG. 12 assume that a TTI consists of N symbols #0 to #N−1. In addition, the examples of FIG. 12 assume that a search space consists of four DL control channel candidates #0 to #3, each DL control channel candidate consists of one CCE, and one CCE consists of two REGs that are distributed over the bandwidth that is available for use, but this is by no means limiting.

Figure 12A:
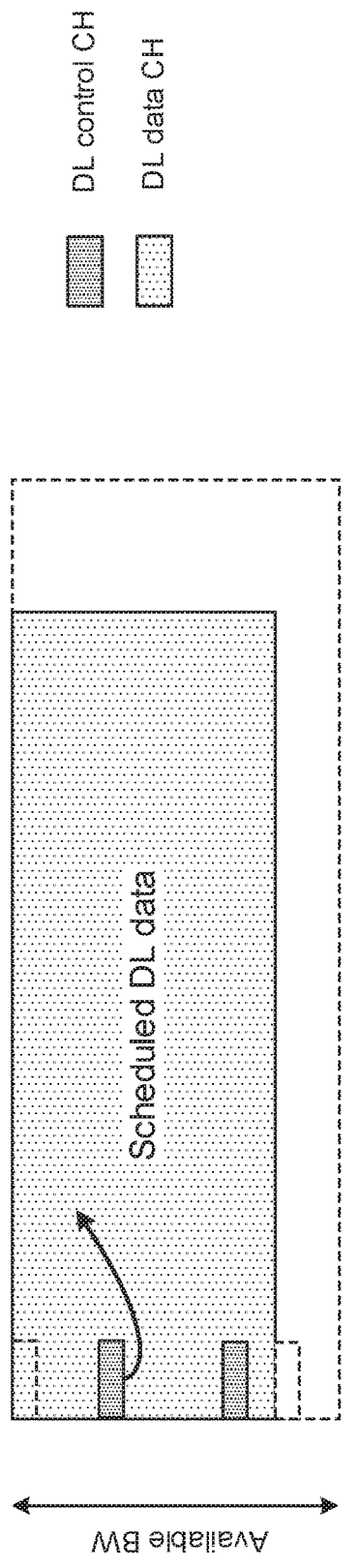
FIGS. 12A and 12B are diagrams to show other examples of the fourth mapping control of a DL data channel according to the first aspect.

As shown in FIG. 12A, if DL control channel candidates #0 to #3 are mapped, in a distributed manner, to a predetermined number of symbols at the top of a TTI, and yet the DL control channel addressed to the user terminal is mapped only to part of the DL control channel candidates (for example, DL control channel candidate #2), DL data channels can be mapped to frequency resources where this DL control channel is not mapped.

Figure 12B:
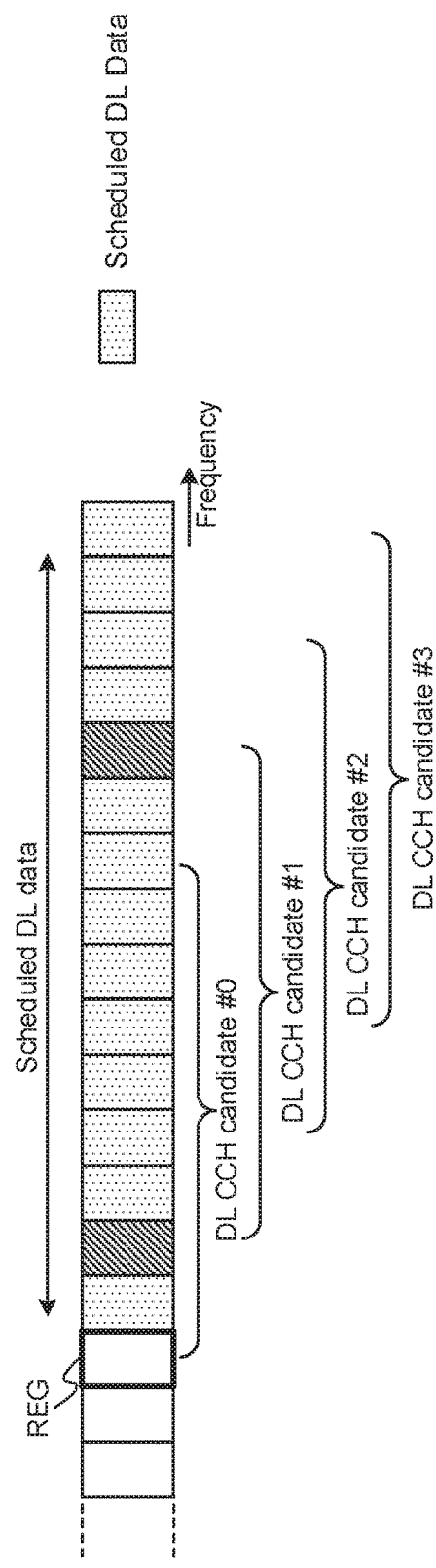

For example, as shown in FIG. 12B, if each DL control channel candidate consists of one CCE that includes two REGs that are placed in a distributed manner, it is possible to map DL data channels to REGs other than the REGs constituting DL control channel candidate #2 where the DL control channel addressed to the user terminal is mapped. In FIG. 12B, in addition to REGs (which may be REs, RBs or RBGs) that do not constitute DL control channel candidates, DL data channels are mapped to the REGs constituting DL control channel candidates #1 and #3 and part of the REGs constituting DL control channel candidate #0.

According to the fourth mapping control, even in symbols where DL control channel candidates are mapped, DL data channels are mapped to frequency resources (for example, RBGs (subbands), RBs or REs) where no user terminal's DL control channel is mapped. Consequently, the efficiency of the use of radio resources can be improved, and improved demodulation performance, as well as improved throughput, can be achieved.

(Others)

Note that, according to the first aspect, whether or not a DL control channel and a DL data channel are frequency-multiplexed on the same frequency resource (for example, RB or RBG), a user terminal may assume that both channels are precoded differently, and demodulate these channels using respective applicable reference signals. By this means, different precoding can be applied to the DL control channel and the DL data channel.

Alternatively, in accordance with the first aspect, when a DL control channel and a DL data channel are frequency-multiplexed on the same frequency resource (for example, RB or RBG), the user terminal may assume that both channels are precoded in the same way, and demodulate these channels using the same reference signal (for example, DMRS multiplexed on the DL data channel). By this means, the overhead of reference signals can be reduced.

Also, according to the first aspect, the mapping of reference signals (RSs) for use for demodulating DL data channels may be changed depending on whether or not DL data channels are mapped to symbols where DL control channel candidates are mapped, in a given TTI or subframe. For example, when a data channel starts being mapped from the first symbol of a given TTI or subframe, the RS can be multiplexed on symbol #0 and symbol #7, and, if the data channel starts being mapped from symbol #2, the RS can be multiplexed on symbol #2 and symbol #8.

By this means, the time tracking performance of channel estimation can be improved. The above RS mapping patterns may be selected per frequency resource (RB, RE, RBG, etc.), independently, or may be selected in common for all the frequency resources (RBs, REs, RBGs, etc.) where DL data channels scheduled. By determining RS mapping patterns separately, the accuracy of channel estimation per frequency resource can be improved. By using common RS mapping between frequency resources, channel estimation values can be interpolated in the frequency direction more accurately.

Also, according to the first aspect, reference signals (RSs) for use for demodulating DL data channels may be mapped in a common way regardless of whether or not DL data channels are mapped to symbols where DL control channel candidates are mapped, in a given TTI or subframe. For example, regardless of from which symbol a data channel starts being mapped in a given TTI or subframe, the RS can be multiplexed on symbol #2 and symbol #7. By this means, the same channel estimation algorithm can be applied regardless of in which symbol the data channel starts, so that the processing load on terminals can be reduced. Furthermore, since a common RS pattern can be used between neighboring cells that are synchronized, it is possible to improve the effect of interference control.

(Second Aspect)

According to a second aspect of the present invention, UL control channels and UL data channels are at least time-division-multiplexed. UL data channels are mapped to frequency resources that are specified by DCI (UL grant) communicated in DL control channels (for example, RBs or RBGs specified by the resource allocation indication field).

Meanwhile, resources for mapping UL control channels (also referred to as "UL control channel resources," "PUCCH (Physical Uplink Control CHannel) resources," and so on) may be determined in a network (NW)-based approach, or in a user terminal (UE)-based approach.

For example, when the NW-based approach is adopted, a user terminal may map a UL control channel to UL control channel resources that are specified explicitly by higher layer signaling and/or physical layer signaling. Alternatively, the user terminal may implicitly determine UL control channel resources based on other radio parameters and/or other pieces of channel configuration information and/or allocation resource information, and map a UL control channel to the UL control channel resources determined thus.

On the other hand, when the UE-based approach is adopted, the UE may map a UL control channel to candidate resources in the search space. The user terminal may select one candidate resource from one or more predetermined candidate resources, and map the UL control channel to the candidate resource selected thus. For example, the user terminal can select a candidate resource based on at least one of CSI, the UCI payload, the subcarrier spacing and so on. The radio base station blind-detects (decodes) one or more candidate resources included in the search space and detects the UL control channel from each user terminal.

Also, based on the UE-based approach, each candidate resource in the search space is referred to as a "UL control channel candidate." Each UL control channel candidate may be comprised of one or more resource units (for example, CCEs, ECCEs and so on, which hereinafter will be referred to as "CCEs") for control channels. A CCE consists of one or more resource units smaller than CCEs. The resource units that are smaller than CCEs may be REs, which have been mentioned earlier, or may be REGs (also referred to as "EREGs" and so on).

One or more CCEs that constitute each UL control channel candidate may consist of localized (or continuous) REs or REGs (localized mapping), or consist of distributed (or discrete) REs or REGs (distributed mapping). Furthermore, the number of CCEs constituting each UL control channel candidate is, for example, one, two, four, eight, sixteen or thirty-two, and is also referred to as "aggregation level" and so on.

Now, with reference to FIG. 13 and FIG. 14, UL control channel candidates for use in UE-based resource selection in accordance with the second aspect will be described. FIG. 13 and FIG. 14 are diagrams to show examples of UL control channel candidates according to the second aspect. Although example cases will be shown with FIG. 13 and FIG. 14 where a UL control channel's search space is comprised of eight UL control channel candidates, the number of UL control channel candidates to constitute the search space is not limited to eight. Furthermore, in FIG. 13 and FIG. 14, a TTI is comprised of N symbols #0 to #N−1.

As shown in FIG. 13, in a search space, a number of UL control channel candidates to be mapped to different numbers of REs and/or symbols (for example, UL control channel candidates #0, #2, #4 and #6) may be provided. Also, in a search space, a number of UL control channel candidates to be mapped to the same number of REs and symbols (for example, UL control channel candidates #0 and #1, #2 and #3, #4 and #5, and #6 and #7) may be provided. Note that the details of UL control channel candidates #0 to #7 shown in FIG. 13 are the same as those of DL control channel candidates #0 to #7 shown in FIG. 5, except that UL control channel candidates #0 to #7 are mapped to different symbols, and therefore will not be described here.

Alternatively, as shown in FIG. 14, a number of UL control channel candidates where not only the number of mapping REs and/or symbols, but also the subcarrier spacing varies (for example, UL control channel candidates #0, #4 and #6) may be provided in a search space. Also, a number of UL control channel candidates to be mapped to the same number of REs and/or symbols and having the same subcarrier spacing (for example, UL control channel candidates #0 and #1, #2 and #3, #4 and #5, and #6 and #7) may be provided in a search space. Note that the details of UL control channel candidates #0 to #7 shown in FIG. 14 are the same as those of DL control channel candidates #0 to #7 shown in FIG. 7, except that UL control channel candidates #0 to #7 are mapped to different symbols, and therefore will not be described here.

The configuration (for example, at least one of mapping symbols, the number of symbols, the number of REs and the number of REGs) of UL control channel candidates #0 to #7 shown in FIG. 13 and FIG. 14 may be determined through at least one of a broadcast signal, higher layer signaling and physical layer signaling.

As described above, according to the second aspect, a UL control channel is mapped to resources that are determined in an NW-based approach or a UE-based approach. In either the NW-based approach or the UE-based approach, a UL control channel may be mapped to localized (or continuous) resources (localized mapping), or mapped to distributed (or discrete) resources (distributed mapping).

Figure 15A:
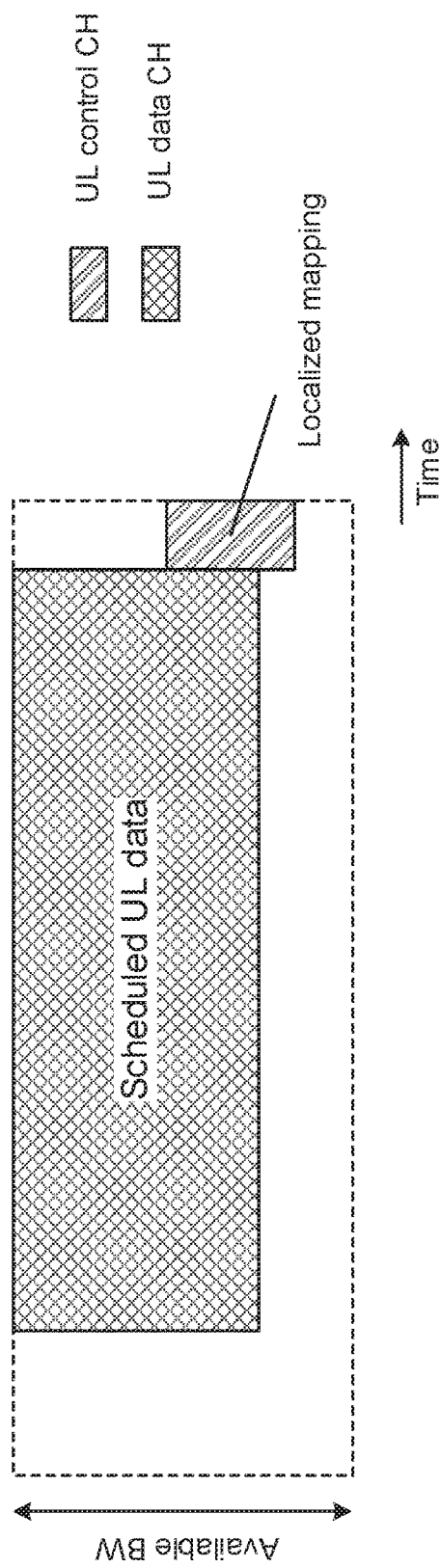
FIGS. 15A and 15B are diagrams to show examples of mapping of a UL control channel according to the second aspect.

FIG. 15 are diagrams to show examples of mapping of a UL control channel according to the second aspect. As shown in FIG. 15A, in localized mapping, in a predetermined number of symbols in a TTI (for example, a predetermined number of symbols at the end of a TTI), a UL control channel may be mapped, in a localized manner, to part of the frequency band that is available for use. Note that, although not shown in the drawing, if the UE-based approach is adopted, one or more CCEs that constitute each UL control channel candidate may consist of localized REs or REGs (see FIG. 2B).

Figure 15B:
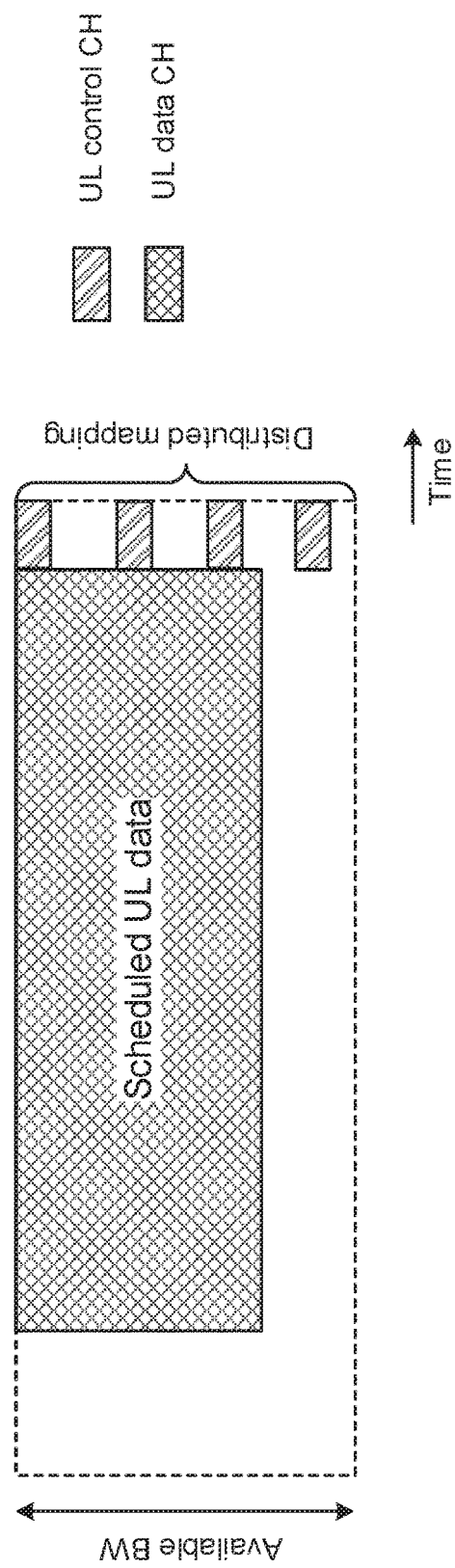
Figure 16A:
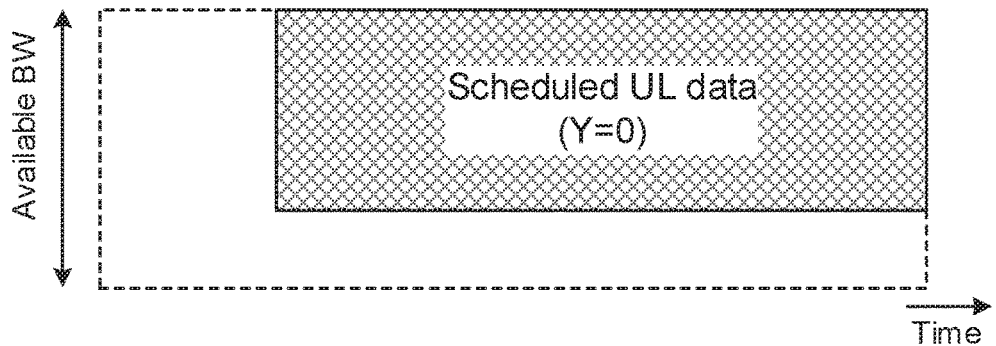
FIGS. 16A to 16D are diagrams to show examples of first mapping control of a UL data channel according to the second aspect.
Figure 16B:
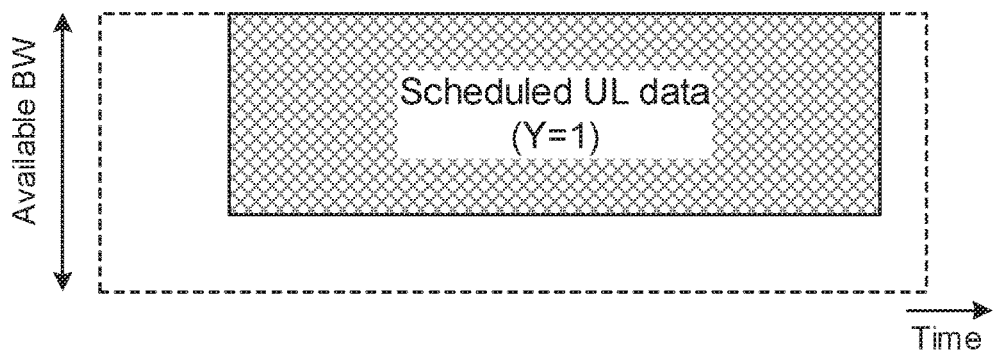
Figure 16C:
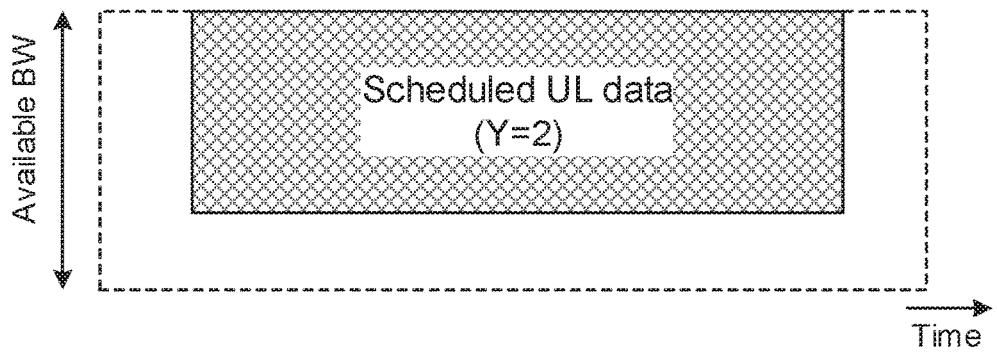
Figure 16D:
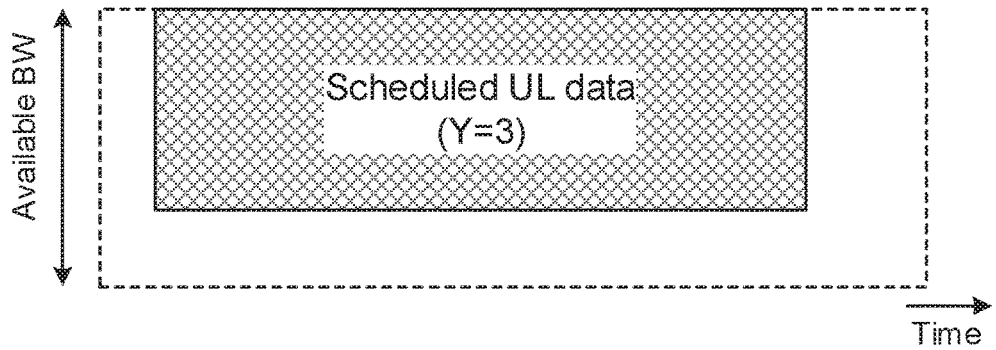

On the other hand, as shown in FIG. 15B, in distributed mapping, in a predetermined number of symbols in a TTI (for example a predetermined number of symbols at the end of a TTI), a UL control channel may be mapped, in a distributed manner, to the frequency band that is available for use. Note that, although not shown in the drawing, if the UE-based approach is adopted, one or more CCEs that constitute each UL control channel candidate may consist of distributed REs or REGs (see FIG. 3B).

Note that, in FIGS. 15A and 15B, although no UL data channel is placed in a predetermined number of symbols at the top of a TTI, a DL control channel (not shown) may be placed in these symbols here, or a UL data channel may be placed.

Now, mapping control of UL data channels according to the second aspect will be described below in detail.

<First Mapping Control>

In the first mapping control, a user terminal does not map a UL data channel to a predetermined number, X, of symbols at the end of a TTI, regardless of whether or not there is a UL control channel. The radio base station performs receiving processes (for example, demapping, demodulation, decoding, etc.) for the UL data channel on assumption that no UL data channel is mapped in the predetermined number X of symbols.

Here, the number of symbols, Y, where no UL data channel is mapped, can take values in the range of $0 \leq Y \leq N$, and N is the number of symbols included in the TTI. This number of symbols, Y, may be a fixed value that is determined in advance. Alternatively, this number of symbols Y may be explicitly configured from the radio base station (or the user terminal) through higher layer signaling and/or physical layer signaling. Alternatively, the number of symbols Y may be determined implicitly in the user terminal (and/or the radio base station) based on other radio parameters, channel (for example, DL data channel) configuration information, and/or resource information. Also, Y may take different values depending on radio frame indices (or subframe indices) and so forth.

FIG. 16 are diagrams to show examples of the first mapping control of UL data channels according to the second aspect. As shown in FIG. 16A, the number of symbols, Y, where no DL data channel is mapped, may be 0. As shown in FIG. 16A, by allowing a UL data channel to be mapped to the last symbol in a TTI, the efficiency of the use of radio resources can be improved. Alternatively, as shown in FIGS. 16B to 16D, the number of symbols, Y, where no UL data channel is mapped, may be one, two or three.

According to the first mapping control, no UL data channel is mapped a predetermined number, X, of symbols at the end of a TTI, so that collisions between a user terminal's UL data channel and other user terminals' UL control channels can be readily prevented.

<Second Mapping Control>

In second mapping control, a user terminal does not have to map a UL data channel to symbols where UL control channel might be mapped. In the above-described NW-based approach is employed, the user terminal may transmit a UL data channel, without mapping the UL data channel, in symbols where UL control channel resources, determined explicitly or implicitly, are included. On the other hand, if the above-described UE-based approach is employed, the user terminal may transmit a UL data channel, without mapping the UL data channel to symbols where UL control channel candidates are mapped.

Now, with reference now to FIG. 17 to FIG. 19, the second mapping control for UL data channels according to the second aspect will be described below in detail. Note that FIG. 17 to FIG. 19 assume that one TTI consists of N symbols #0 to #N−1. Also, although, in FIG. 17 to FIG. 19, no UL data channel is mapped to symbols #0 and #1, UL data channels may be mapped in these symbols #0 and #1, or DL control channels (and guard period) may be mapped.

Figure 17A:
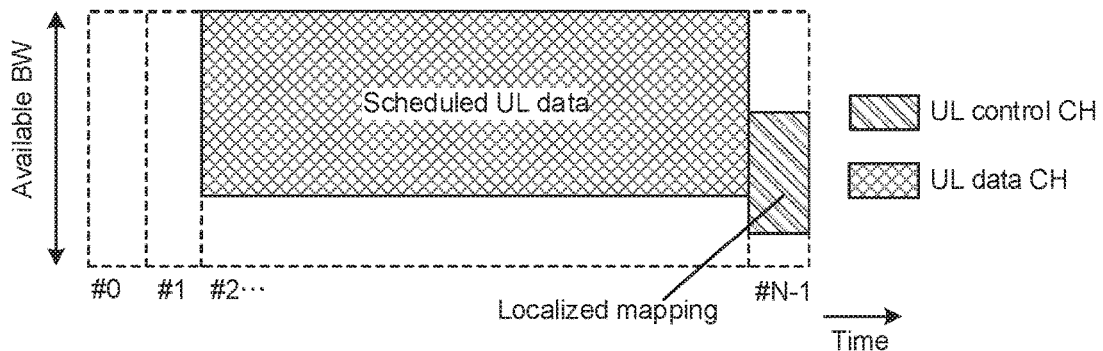
FIGS. 17A to 17C are diagrams to show examples of second mapping control of a UL data channel according to the second aspect.
Figure 17B:
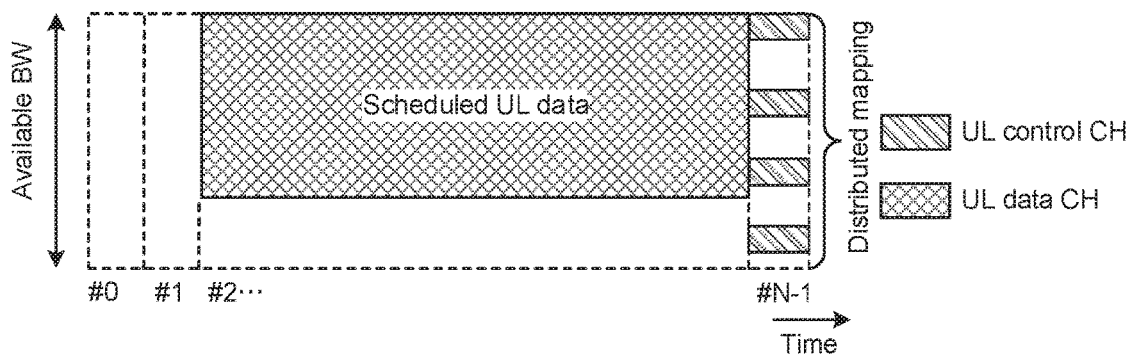

FIG. 17 are diagrams to show examples of the second mapping control for UL data channels according to the second aspect. FIG. 17 assume cases where a UL control channel is mapped to UL control channel resources that are determined based on the NW-based approach. In addition, FIG. 17A shows an example of localized mapping, and FIG. 17B shows an example of distributed mapping.

As shown in FIGS. 17A and 17B, when a UL control channel resource that is determined based on the NW-based approach is included in symbol #N−1, a user terminal does not map a UL data channel to symbol #N−1 even if the UL data channel is scheduled in this TTI or subframe. The radio base station assumes that the UL data channel is not mapped to this symbol #N−1, and performs receiving processes (for example, demapping, demodulation, and decoding) for this UL data channel.

Figure 17C:
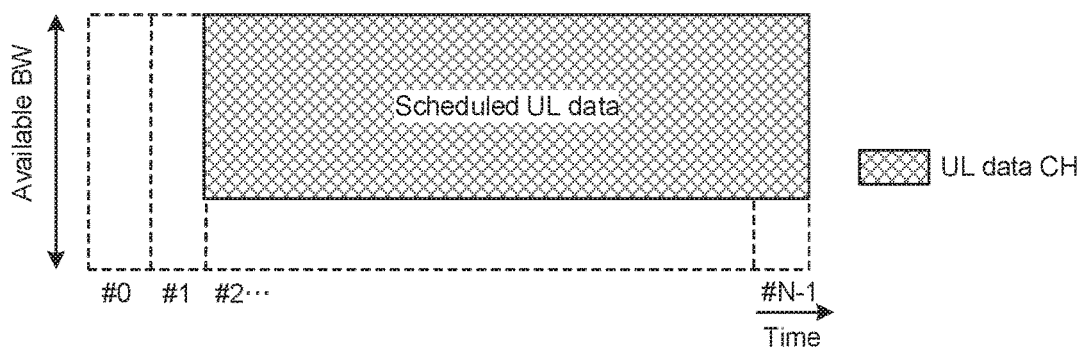

On the other hand, when, as shown in FIG. 17C, no UL control channel is transmitted in a TTI in which a UL data channel is transmitted, the user terminal can also map the UL data channel to symbol #N−1, in which the above UL control channel resource is included.

In this manner, the user terminal can determine whether or not a UL data channel can be mapped to a symbol in which a UL control channel resource is included, based on whether or not a UL control channel is transmitted.

FIG. 18 are diagrams to show other examples of the second mapping control for UL data channels according to the second aspect. FIG. 18 assume cases where UL control channels are mapped to UL control channel candidates in a search space, which are used in the UE-based approach. In addition, FIG. 18 assume that UL control channel candidates #0 to #7 shown in FIG. 13 are configured in user terminals #1 and #2, user terminal #1 selects UL control channel candidate #3 (72 REs in symbol #N−1), and user terminal #2 selects UL control channel candidate #6 (216 REs in symbols #N−1 to #N−3).

FIG. 18A shows an example of localized mapping. As shown in FIG. 18A, the UL control channel of user terminal #1 may be mapped to 72 localized REs in symbol #N−1 (for example, 72 REs in one RB). Furthermore, the UL control channel of user terminal #2 may be mapped to 216 localized REs in symbols #0 to #2 (for example, 216 REs in one RB).

FIG. 18B shows an example of distributed mapping. As shown in FIG. 18B, the UL control channel of user terminal #1 may be mapped to 72 REs that are distributed over the frequency band that is available for use, in symbol #N−1. Furthermore, the UL control channel of user terminal #2 may be mapped to 216 REs that are distributed over the frequency band that is available for use, in symbols #N−1 to #N−3.

In each case of FIGS. 18A and 18B, the radio base station blind-decodes UL control channel candidates #0 to #7 in the search space shown in FIG. 13. The radio base station detects the UL control channel of user terminal #1 in UL control channel candidate #3, and detects the UL control channel of user terminal #1 in UL control channel candidate #6.

In FIGS. 18A and 18B, although user terminal #1 maps the UL control channel of user terminal #1 only to symbol #N−1, there is a possibility that other user terminals' UL control channels are mapped to other UL control channel candidates, so that user terminal #1 does not map the UL data channel to symbols #N−1 to #N−3. The same applies to user terminal #2.

Thus, in FIG. 18, the user terminal does not map the UL data channel to symbols where at least one UL control channel candidate is mapped (symbols #N−1 to #N−3 when UL control channel candidates #0 to #7 shown in FIG. 13 are used). Thereby it is possible to prevent collision between the UL data channel of the user terminal and the UL control channel of another user terminal.

Figure 19A:
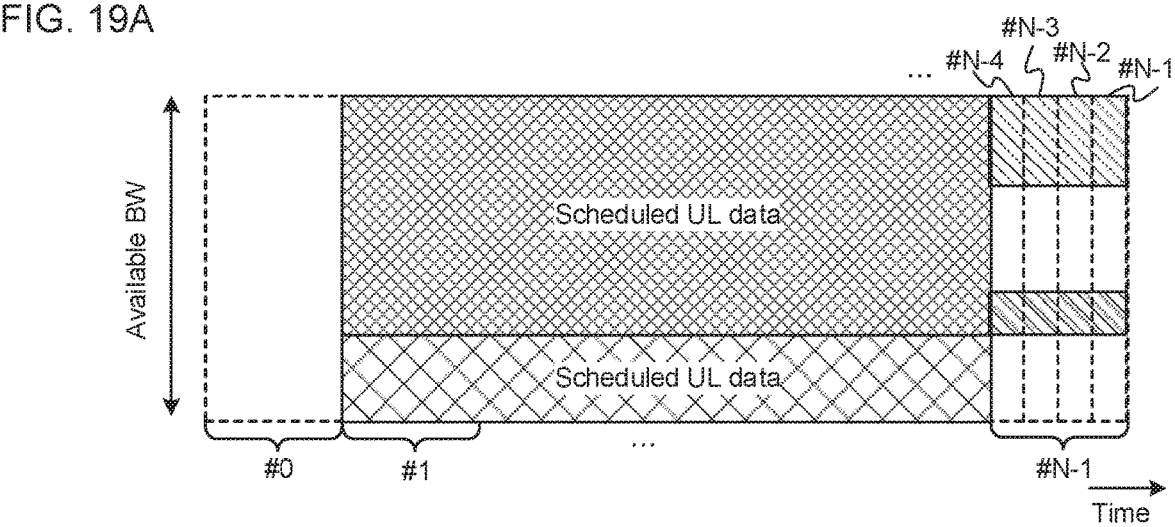
FIGS. 19A to 19C are diagrams to show other examples of the second mapping control of UL data channels according to the second aspect.
Figure 19B:
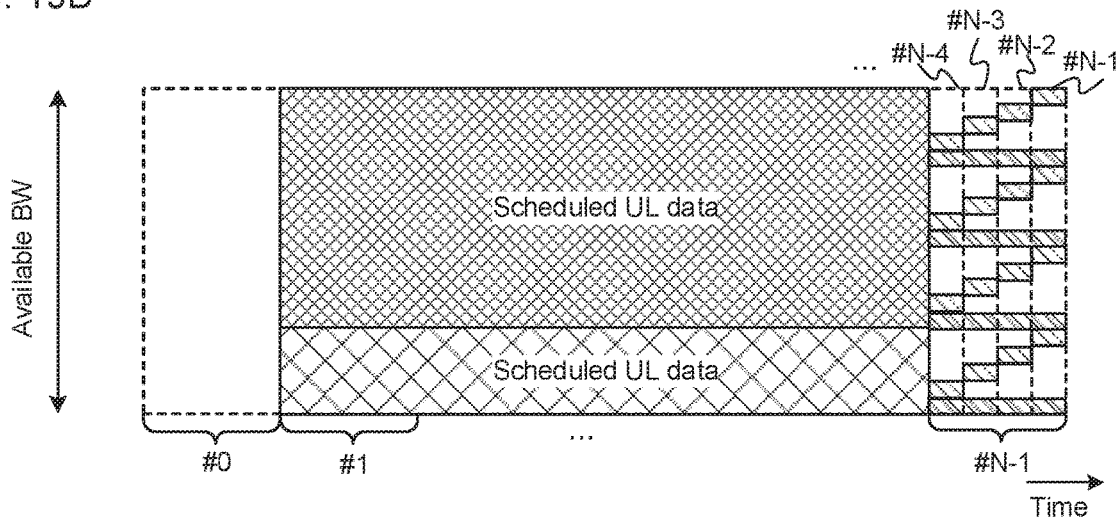
Figure 19C:
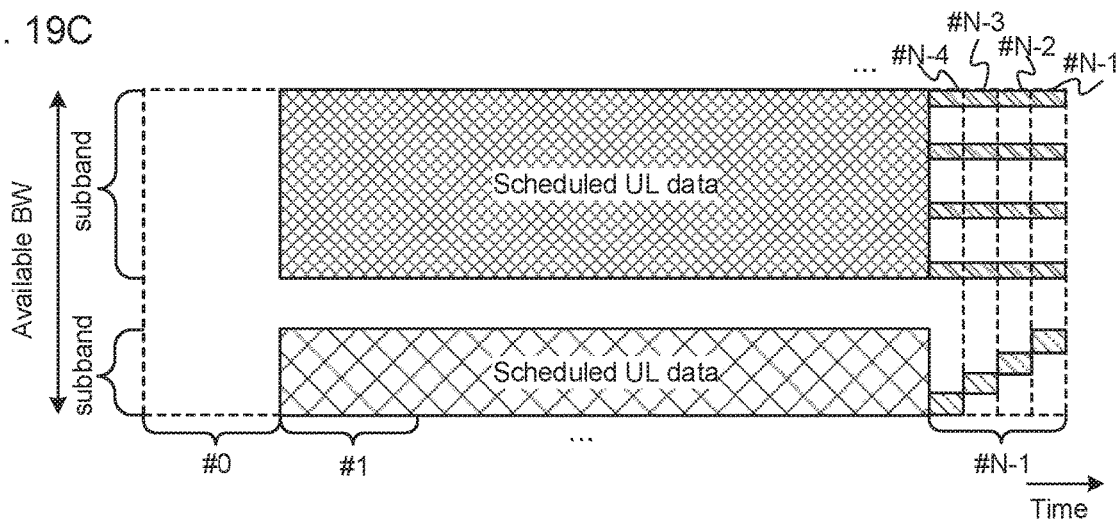

FIG. 19 are diagrams to show other examples of the second mapping control for UL data channels according to the second aspect. FIG. 19 assume cases where UL control channels are mapped to UL control channel candidates in a search space, which are used in the UE-based approach. In addition, FIG. 19 assume that UL control channel candidates #0 to #7 shown in FIG. 14 are configured in user terminals #1 and #2, user terminal #1 selects UL control channel candidate #3 (72 REs in symbol #N−1 where the subcarrier spacing is 15 kHz), and user terminal #2 selects UL control channel candidate #6 (144 REs in symbols #N−1 to #N−4 where the subcarrier spacing is 60 kHz).

FIG. 19 are the same as FIG. 18 except that UL control channel candidates #0 to #7 shown in FIG. 14 are used instead of UL control channel candidates #0 to #7 shown in FIG. 13, and therefore will not be described here.

<Third Mapping Control>

According to third mapping control, even in a symbol where a UL control channel might be mapped, a user terminal can map a UL data channel to frequency resources (for example, RBGs (subbands), RBs or REs) where the UL control channel is not mapped. By this means, in this example of third mapping control, UL control channels and UL data channels are orthogonally multiplexed not only in the time direction but also in the frequency direction.

When the above-described NW-based approach is adopted, even in a symbol where UL control channel resources that are determined explicitly or implicitly are included, the user terminal may map a UL data channel to frequency resources that are included in frequency resources scheduled for the UL data channel and that have no UL control channel mapped thereon.

Also, when the above-described UE-based approach is adopted, even in a symbol where a UL control channel candidate is mapped, the user terminal may map a UL data channel to frequency resources that are included in frequency resources scheduled for the UL data channel and that have no UL control channel mapped thereon. Note that the configurations described with reference to FIG. 13 and FIG. 14 can be applied to this UL control channel candidate.

In the above-described NW-based approach and UE-based approach, even in the same symbol, transmission power may be assigned to frequency resources (for example, REs, RBs and/or RBGs) where UL control channels are mapped and to frequency resources where UL data channels are mapped, based on different rules.

For example, when there are frequency resources for mapping UL control channels and frequency resources for mapping UL data channels, at least one of semi-static transmission power control parameters that are configured by higher layer signaling, and parameters that are controlled through physical layer signaling (for example, TPC commands) may be provided separately.

Figure 20A:
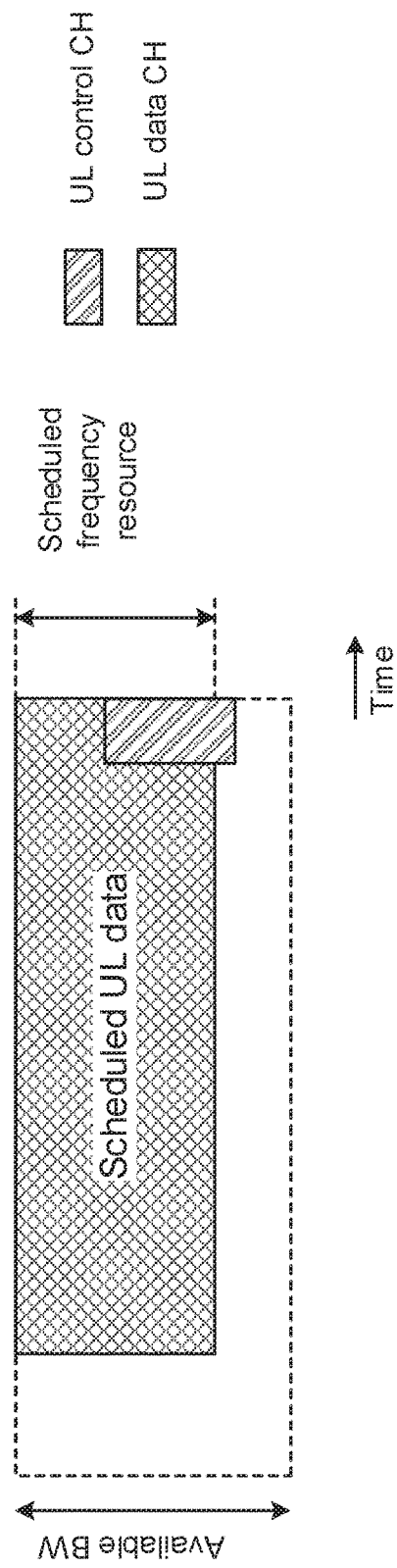
FIGS. 20A and 20B are diagrams to show examples of third mapping control of a UL data channel according to the second aspect.
Figure 20B:
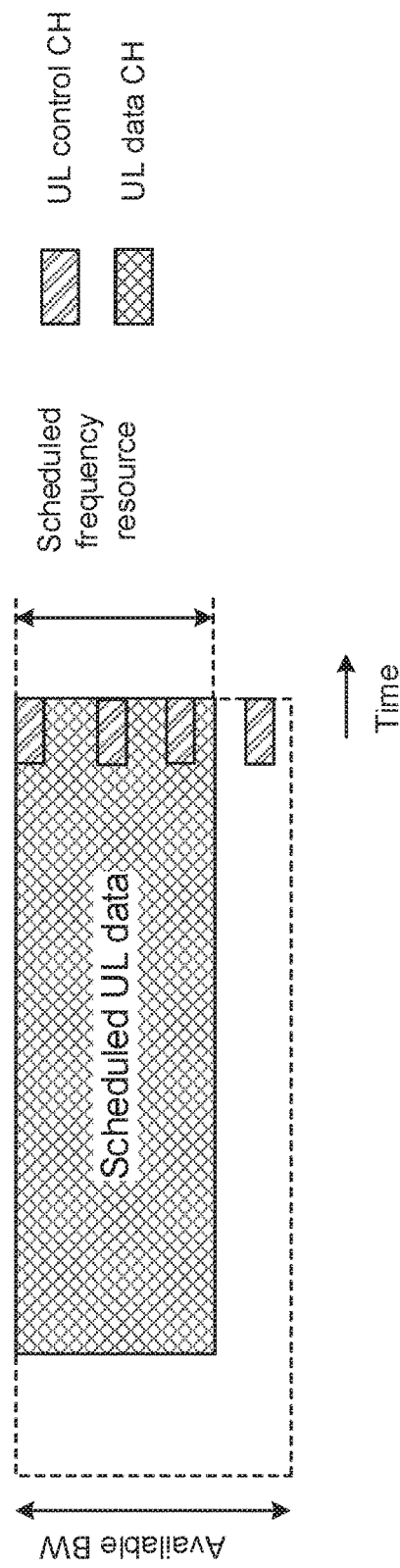

FIG. 20 are diagrams to show examples of the third mapping control for UL data channels according to the second aspect. Note that FIG. 20 assume cases where a UL control channel is mapped to UL control channel resources that are determined based on the NW-based approach. FIG. 20A shows a case where a UL control channel is mapped in a localized manner, and FIG. 20B shows a case where a UL control channel is mapped in a distributed manner.

As shown in FIGS. 20A and 20B, even when a symbol contains UL control channel resources, a user terminal may map a UL data channel to frequency resources that are included in frequency resources scheduled for the UL data channel and that have no UL control channels mapped thereon.

Note that, although not shown in the drawing, when no UL control channel is transmitted and a UL control channel resource is included in a symbol, the user terminal can map the UL data channel to this UL control channel resource. Thus, the user terminal may determine whether or not a UL data channel can be mapped to a UL control channel resource based on whether or not a UL control channel is transmitted.

Figure 21A:
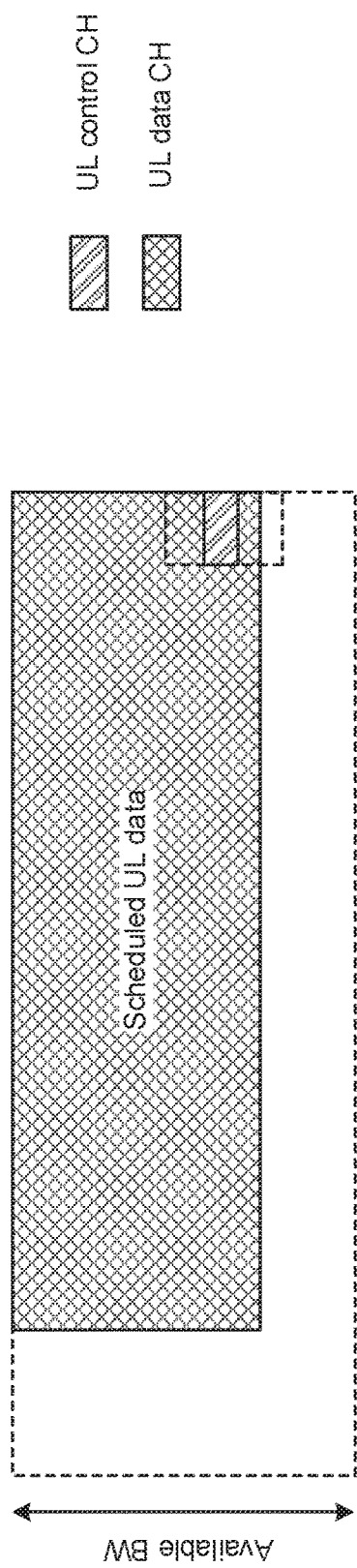
FIGS. 21A and 21B are diagrams to show other examples of the third mapping control of a UL data channel according to the second aspect.
Figure 21B:
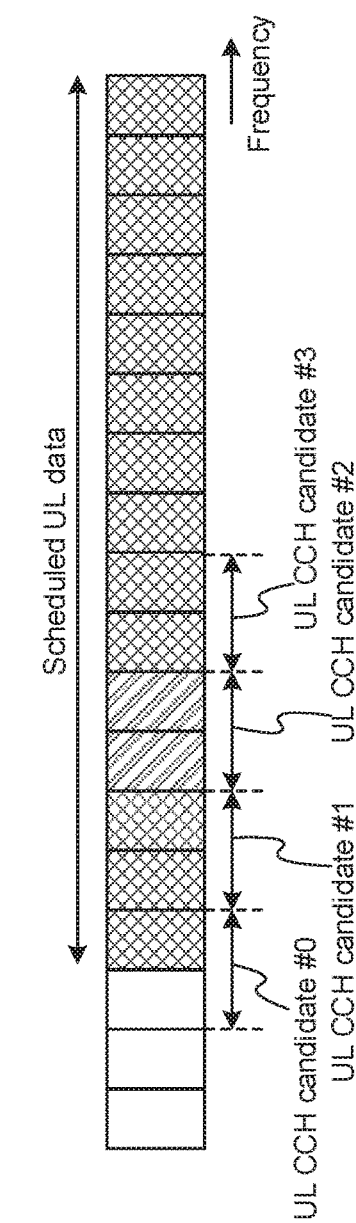
Figure 22A:
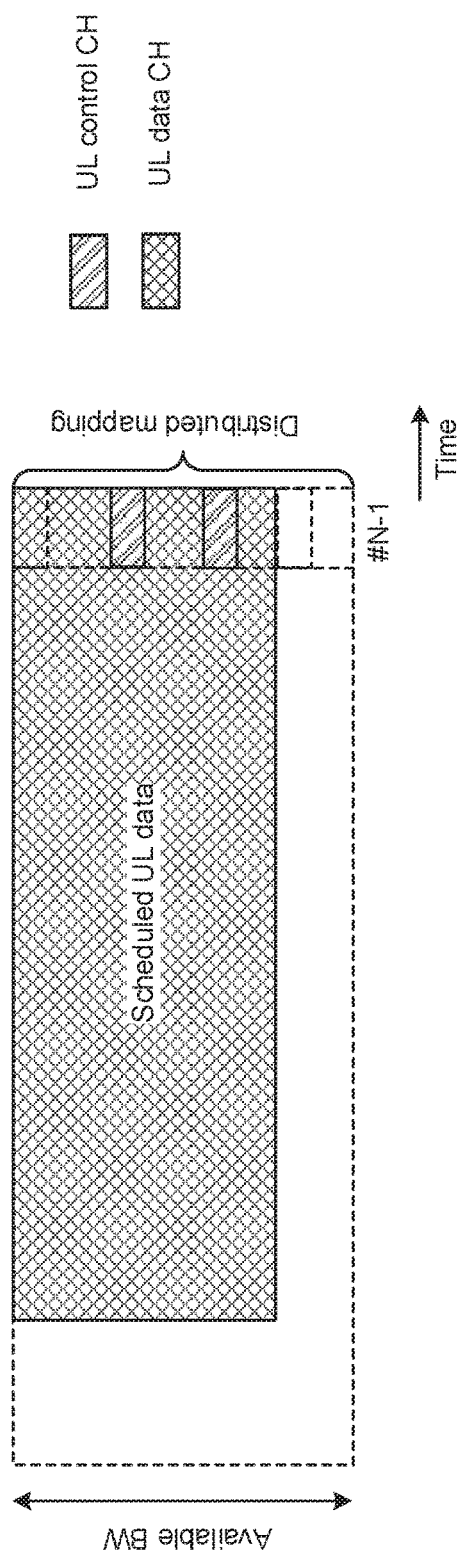
FIGS. 22A and 22B are diagrams to show other examples of the third mapping control of a UL data channel according to the second aspect.
Figure 22B:
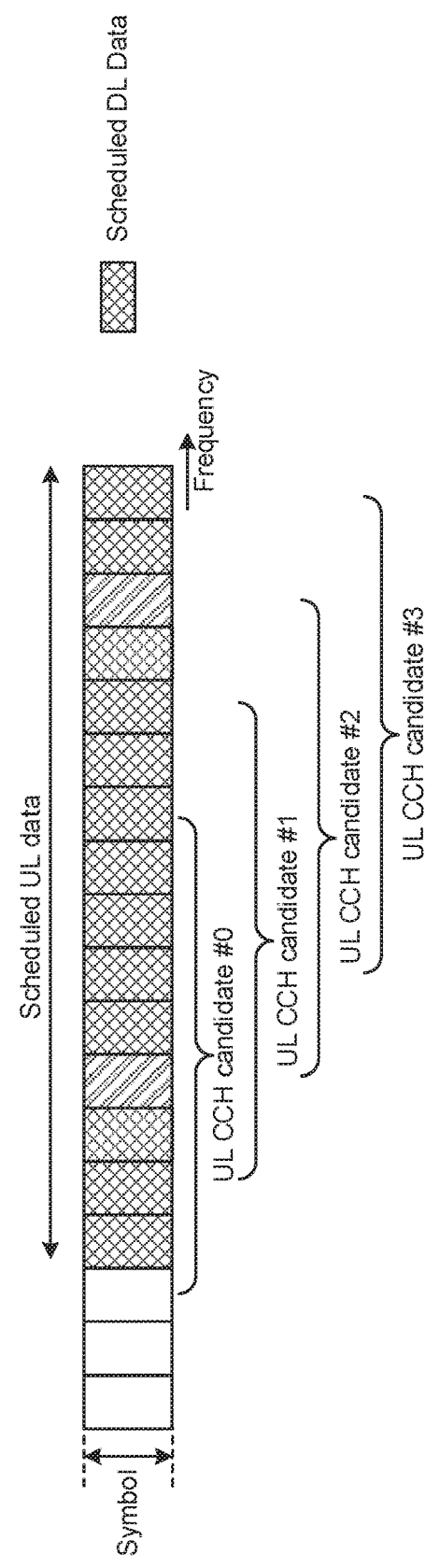

FIG. 21 and FIG. 22 are diagrams to show other examples of the third mapping control for UL data channels according to the second aspect. Also, FIG. 21 and FIG. 22 assume cases where a UL control channel is mapped to UL control channel candidates in a search space, which are used in the UE-based approach. FIG. 21 show cases where a UL control channel is mapped in a localized manner, and FIG. 22 show cases where a UL control channel is mapped in a distributed manner.

As shown in FIG. 21 and FIG. 22, even in a symbol that contains UL control channel candidates #0 to #3, the user terminal may map a UL data channel to frequency resources that are included in frequency resources scheduled for the UL data channel and that have no UL control channels mapped thereon.

For example, as shown in FIG. 21 and FIG. 22, when each UL control channel candidate consists of one CCE that includes two REGs, UL data channels can be mapped to REGs other than the REGs constituting UL control channel candidate #2 to which a UL control channel is mapped. In FIG. 21 and FIG. 22, in addition to REGs (which may be REs, RBs or RBGs) that do not constitute UL control channel candidates, DL data channels are mapped to the REGs constituting UL control channel candidates #1 and #3 and part of the REGs constituting UL control channel candidate #0.

According to the third mapping control, UL control channels and UL data channels are frequency-division-multiplexed in symbols where UL control channels might be mapped, so that the efficiency of the use of radio resources can be improved.

<Fourth Mapping Control>

Fourth mapping control assumes a case where UL control channels are mapped to UL control channel candidates in a search space, which are used in the UE-based approach. In the fourth mapping control, even when a UL control channel candidate is mapped in a symbol, a user terminal may map a UL data channel to frequency resources that are included in frequency resources scheduled for the UL data channel and that have no UL control channel candidate mapped thereon. Note that the configurations described with reference to FIG. 13 and FIG. 14 can be applied to this UL control channel candidate here.

Figure 23A:
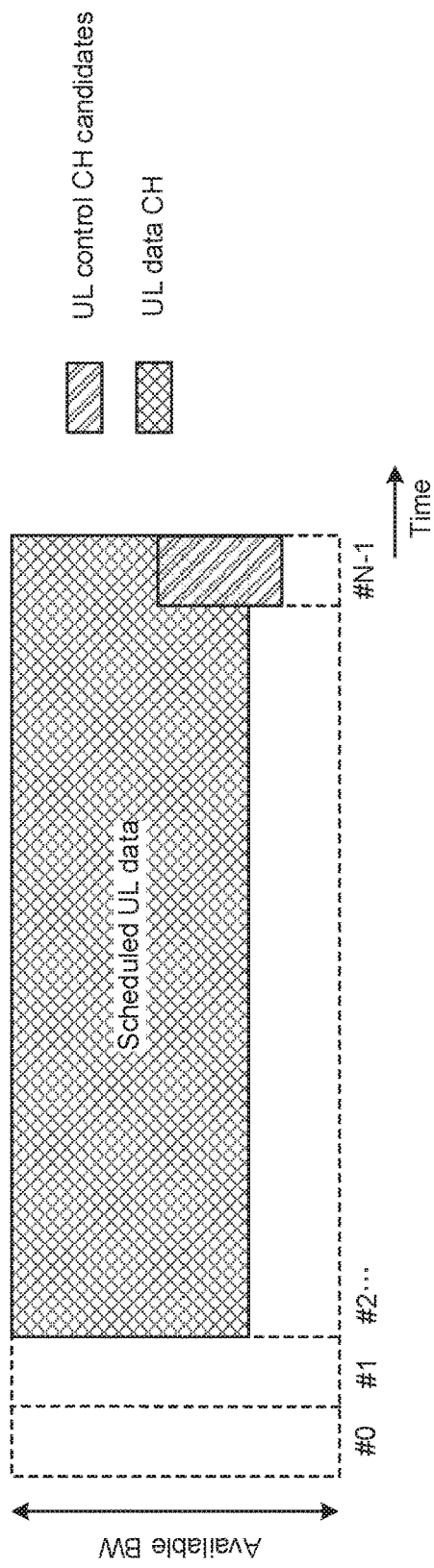
FIGS. 23A and 23B are diagrams to show examples of fourth mapping control of a UL data channel according to the second aspect.
Figure 23B:
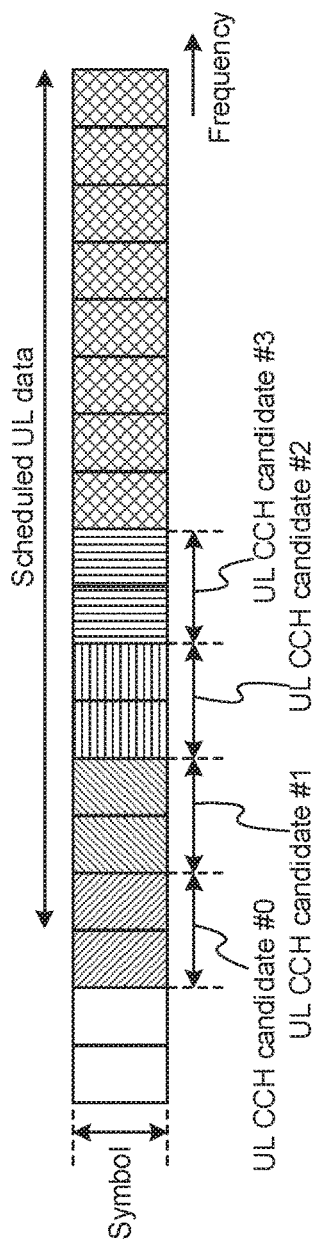
Figure 24A:
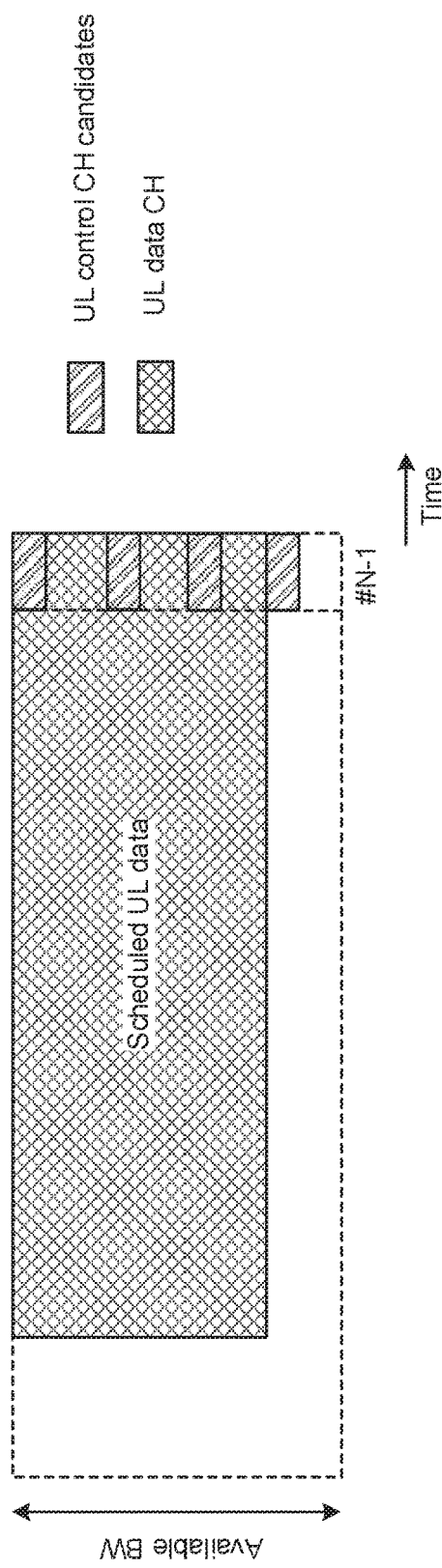
FIGS. 24A and 24B are diagrams to show other examples of the fourth mapping control of a UL data channel according to the second aspect.
Figure 24B:
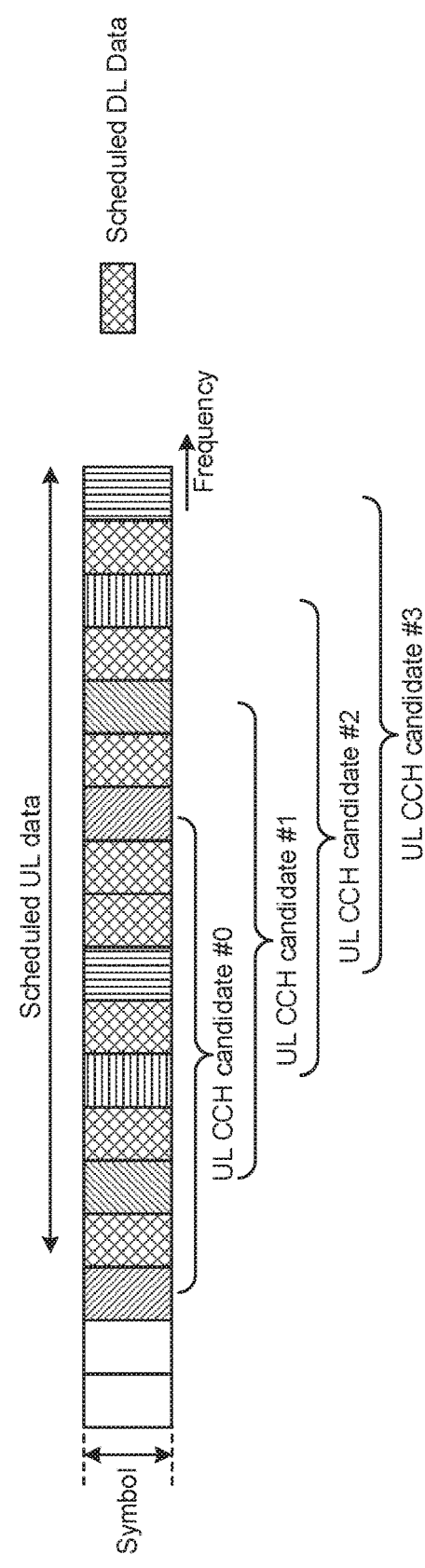

FIG. 23 and FIG. 24 are diagrams to show examples of the fourth mapping control for UL data channels according to the second aspect. Also, FIG. 23 and FIG. 24 assume cases where a UL control channel is mapped to UL control channel candidates in a search space, which are used in the UE-based approach. FIG. 23 show cases where a UL control channel is mapped in a localized manner, and FIG. 24 show cases where a UL control channel is mapped in a distributed manner.

As shown in FIG. 23 and FIG. 24, even in a symbol that contains UL control channel candidates #0 to #3, the user terminal may map a UL data channel to frequency resources that are included in frequency resources scheduled for the UL data channel and that do not have UL control channel candidates #0 to #3 mapped thereon.

For example, as shown in FIG. 23 and FIG. 24, when each UL control channel candidate consists of one CCE that includes two REGs, UL data channels can be mapped to REGs other than the REGs constituting UL control channel candidates #0 to #3.

According to the fourth mapping control, UL control channels and UL data channels are frequency-division-multiplexed in symbols where UL control channel candidates are included, so that the efficiency of the use of radio resources can be improved.

(Others)

Note that, according to the second aspect, whether or not a DL control channel and a DL data channel are frequency-multiplexed on the same frequency resource (for example, RB or RBG), a user terminal may assume that both channels are precoded differently, and multiplex and transmit these channels using reference signals that are precoded in the same way as each channel. The radio base station performs channel estimation and demodulation using the reference signals corresponding to each channel. By this means, different precoding can be applied to the UL control channel and the UL data channel.

Alternatively, in accordance with the second aspect, when a UL control channel and a UL data channel are frequency-multiplexed on the same frequency resource (for example, RB or RBG), the user terminal may apply the same precoding to both channels, multiplex reference signals that are precoded in the same way as both channels and transmit these. The radio base station can demodulate the UL data channel and the UL control channel based on channel estimation results obtained using these reference signals. By this means, the overhead of reference signals can be reduced.

Also, according to the second aspect, the mapping of reference signals (RSs) for use for demodulating UL data channels may be changed depending on whether or not UL data channels are mapped to symbols where UL control channels or UL control channel candidates are mapped, in a given TTI or subframe. For example, when a data channel is mapped to the last symbol of a given TTI or subframe, the RS can be multiplexed on the first symbol of the UL data and symbol #7, and, if the data channel finishes being mapped in symbol #N−3, the RS can be multiplexed on the first symbol data of the UL data and symbol #8.

By this means, the time tracking performance of channel estimation can be improved. The above RS mapping patterns may be selected per frequency resource (RB, RE, RBG, etc.), independently, or may be selected in common for all the frequency resources (RBs, REs, RBGs, etc.) where UL data channels scheduled. By determining RS mapping patterns separately, the accuracy of channel estimation per frequency resource can be improved. By using common RS mapping between frequency resources, channel estimation values can be interpolated in the frequency direction more accurately.

Also, according to the second aspect, the mapping of reference signals (RSs) for use for demodulating UL data channels may be changed regardless of whether or not UL data channels are mapped to symbols where UL control channels or UL control channel candidates are mapped, in a given TTI or subframe. For example, regardless of in which symbol a data channel finishes being mapped in a given TTI or subframe, the RS can be multiplexed over the first symbol of the UL data and symbol #7. By this means, the same channel estimation algorithm can be used even in symbols where a data channel ends, so that the processing load on terminals can be reduced. Furthermore, since a common RS pattern can be used between neighboring cells that are synchronized, it is possible to improve the effect of interference control.

(Radio Communication System)

Now, the structure of a radio communication system according to the present embodiment will be described below. In this radio communication system, the radio communication methods according to the above-described embodiments are employed. Note that the radio communication methods according to each embodiment described above may be used alone or may be used in combination.

Figure 25:
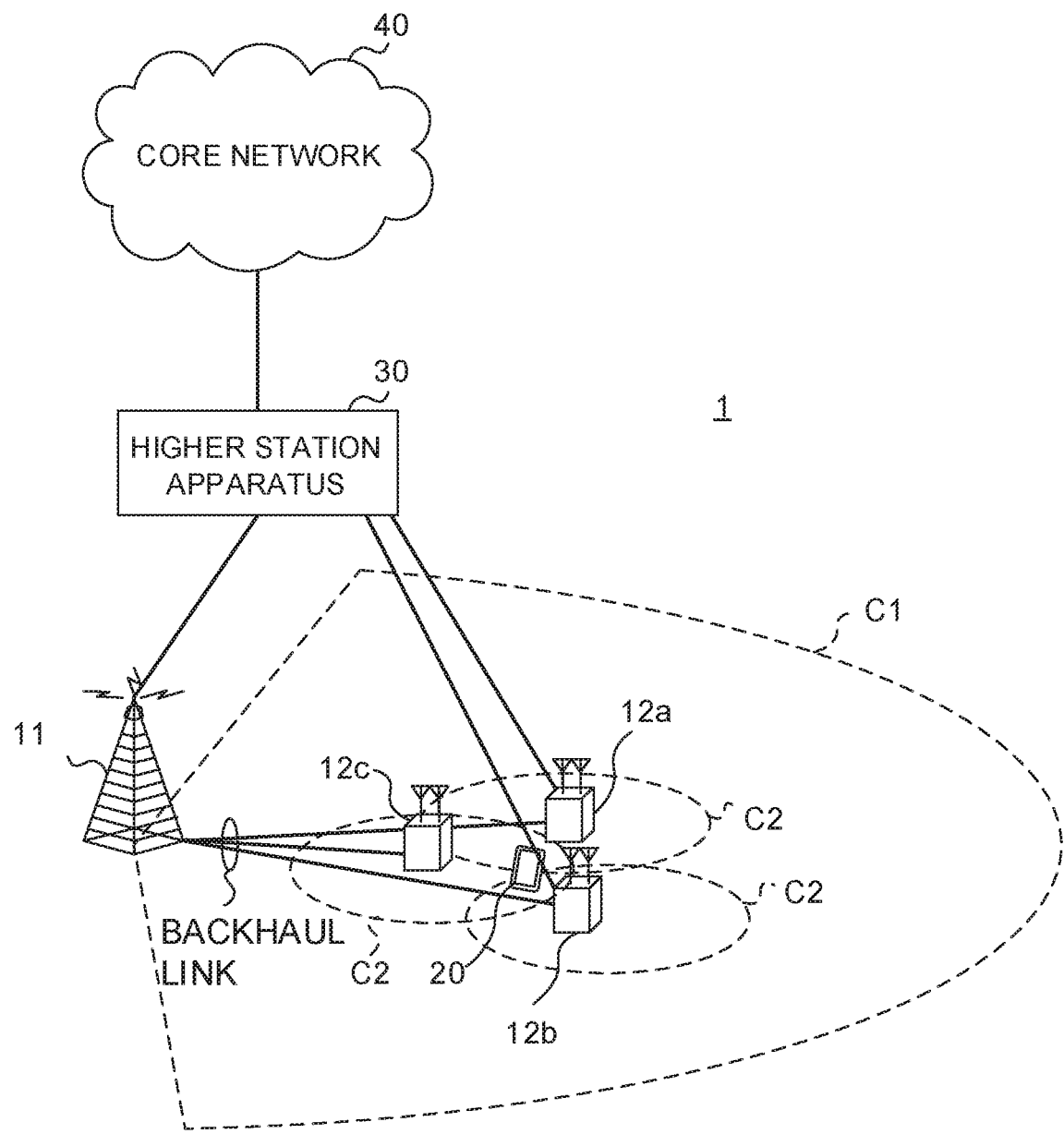
FIG. 25 is a diagram to show an example of a schematic structure of a radio communication system according to an embodiment of the present invention.

FIG. 25 is a diagram to show an example of a schematic structure of a radio communication system according to an embodiment of the present invention. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit. Note that the radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology))," and so on.

The radio communication system 1 shown in FIG. 25 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure may be adopted here in which different numerologies are used between cells and/or within cells.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Furthermore, in each cell (carrier), a single numerology may be employed, or a plurality of different numerologies may be employed. Here, a "numerology" refers to a communication parameter to be found in the frequency direction and/or the time direction (for example, at least one of the subcarrier spacing, the bandwidth, the symbol duration, the CP duration, the TTI duration, the number of symbols per TTI, the radio frame structure, the filtering process, the windowing process and so on).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, optical fiber in compliance with CPRI (Common Public Radio Interface), the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on.

Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (Orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

In the radio communication system 1, a DL data channel (PDSCH (Physical Downlink Shared CHannel), which is also referred to as, for example, a "DL shared channel"), which is shared by each user terminal 20, a broadcast channel (PBCH (Physical Broadcast CHannel)), L1/L2 control channels and so on are used as DL channels. User data, higher layer control information, SIBs (System Information Blocks) and so on are communicated in the PDSCH. Also, the MIB (Master Information Block) is communicated in the PBCH.

The L1/L2 control channels include a DL control channel (PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. It is possible to communicate HARQ retransmission control information (ACK/NACK) in response to the PUSCH using at least one of the PHICH, the PDCCH and the EPDCCH.

In the radio communication system 1, a UL data channel (PUSCH (Physical Uplink Shared CHannel), which is also referred to as "UL shared channel" and so on), which is shared by each user terminal 20, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of DL signal retransmission control information (A/N), channel state information (CSI) and so on, is communicated in the PUSCH or the PUCCH. Random access preambles for establishing connections with cells can be communicated by means of the PRACH.

(Radio Base Station)

Figure 26:
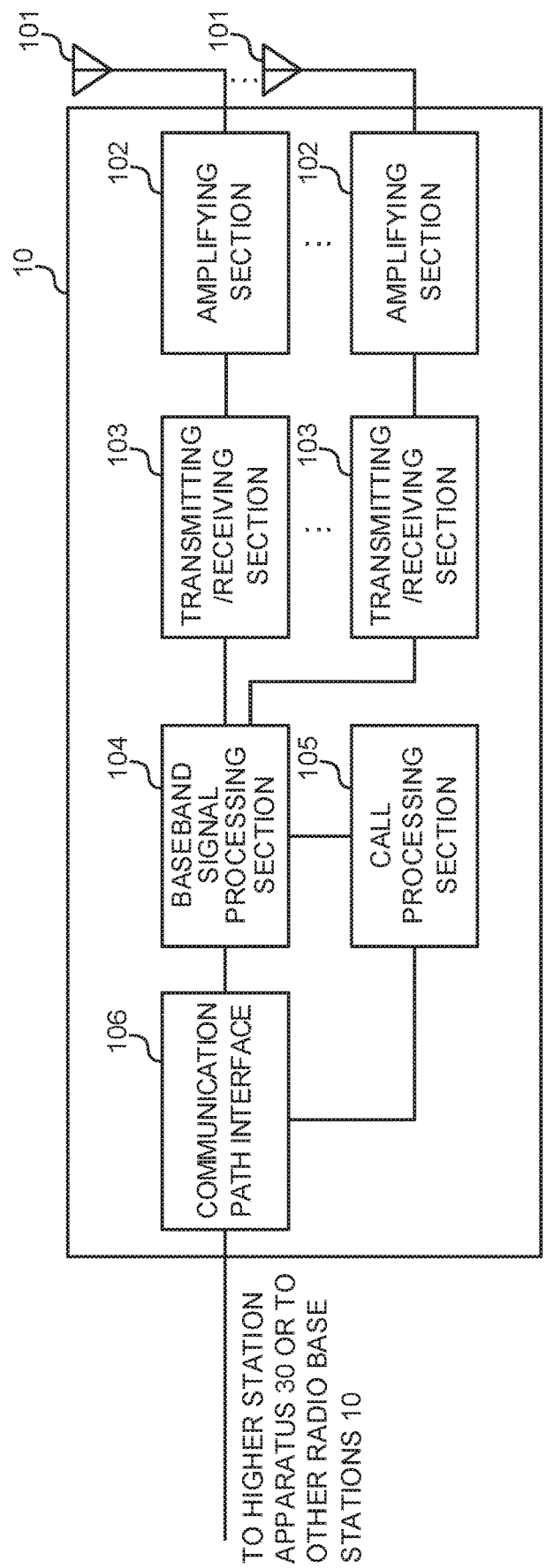
FIG. 26 is a diagram to show an example of an overall structure of a radio base station according to the present embodiment.

FIG. 26 is a diagram to show an example of an overall structure of a radio base station according to the present embodiment. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process and so on, and the result is forwarded to the transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface 106 transmits and receives signals to and from the higher station apparatus 30 through a predetermined interface. Also, the communication path interface 106 may transmit and/or receive signals (backhaul signaling) with neighboring radio base stations 10 via an inter-base station interface (for example, optical fiber in compliance with CPRI (Common Public Radio Interface), the X2 interface, etc.).

In addition, the transmitting/receiving sections 103 transmit and/or receive a control channel, and a data channel that is at least time-division-multiplexed with this control channel. To be more specific, the transmitting/receiving sections 103 transmit a DL control channel, and a DL data channel that is at least time-division-multiplexed with the DL control channel (first aspect). Here, the DL control channel may be mapped to candidate resources (DL control channel dates) in a search space.

In addition, the transmitting/receiving sections 103 receive a UL control channel, and a UL data channel that is at least time-division-multiplexed with the UL control channel (second aspect). Here, the UL control channel may be mapped to candidate resources (UL control channel candidates) in a search space (UE-based approach), or may be mapped to resources (UL control channel resources) that are determined explicitly or implicitly (NW-based approach).

Figure 27:
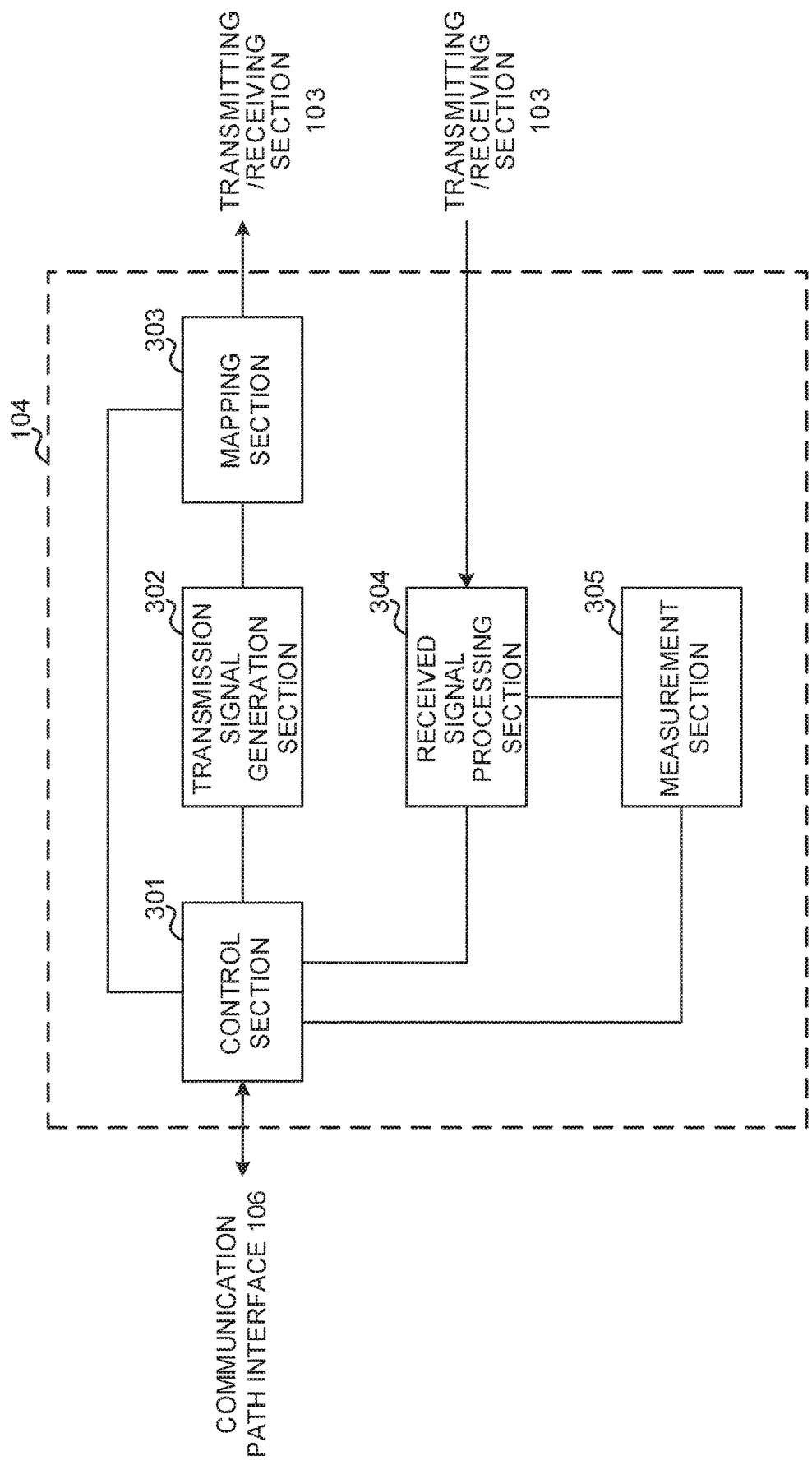
FIG. 27 is a diagram to show an example of a functional structure of a radio base station according to the present embodiment.

FIG. 27 is a diagram to show an example of a functional structure of a radio base station according to the present embodiment. Note that, although FIG. 27 primarily shows functional blocks that pertain to characteristic parts of the present embodiment, the radio base station 10 has other functional blocks that are necessary for radio communication as well. As shown in FIG. 27, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, generation of DL signals in the transmission signal generation section 302, mapping of DL signals in the mapping section 303, UL signal receiving process (for example, demodulation) in the received signal processing section 304 and measurements in the measurement section 305.

The control section 301 schedules DL data channels and DL data channels for user terminals 20.

The control section 301 also controls transmission and/or receipt of a data channel based on at least one candidate resource in a control channel's search space. To be more specific, the control section 301 may control transmission of a DL data channel based on at least one candidate resource (DL control channel candidate) in the search space for a DL control channel (first aspect).

For example, the control section 301 may exert control so that the DL data channel is not mapped to a predetermined number X of symbols at the top of a TTI (the first mapping control according to the first aspect). The control section 301 may exert control so that the DL data channel is not mapped in a symbol that contains the above at least one candidate resource (DL control channel candidate) (the second mapping control according to the first aspect).

Alternatively, the control section 301 may exert control so that, even in a symbol where the above at least one candidate resource is included, the DL data channel is mapped to frequency resources, which are included in frequency resources scheduled for the DL data channel, and in which the above at least one candidate resource is not included (the third mapping control according to the first aspect).

Alternatively, the control section 301 may exert control so that, even in a symbol where the above at least one candidate resource is included, the DL data channel is mapped to frequency resources, which are included in frequency resources scheduled for the DL data channel, and to which no DL control channel is mapped (the fourth mapping control according to the first aspect).

Furthermore, the control section 301 may control receipt of a UL data channel based on UL control channel resources, which are specified in an explicit or implicit manner (NW-based approach), or based on at least one candidate resource (UL control channel candidate) in a search space for a UL control channel (UE-based approach) (second aspect).

For example, the control section 301 may assume that the UL data channel is not mapped to a predetermined number X of symbols at the top of a TTI (the first mapping control according to the second aspect). The control section 301 may assume that, in a symbol that contains this UL control channel resource (NW-based approach), or in a symbol where the above at least one candidate resource (UL control channel candidate) is included (UE-based approach), the UL data channel is not mapped (the second mapping control according to the first aspect).

Alternatively, the control section 301 may assume that, even in a symbol where the above at least one candidate resource is included (UE-based approach), the UL data channel is mapped to frequency resources, which are included in frequency resources scheduled for the UL data channel, and in which the above at least one candidate resource is not included (the fourth mapping control according to the second aspect).

Alternatively, the control section 301 may assume that, even in a symbol where the above UL control channel resource is included (NW-based approach), or in a symbol where the above at least one candidate resource is included (UE-based approach), the UL data channel is mapped to frequency resources, which are included in frequency resources scheduled for the UL data channel, and to which no UL control channel is mapped (the third mapping control according to the second aspect).

The control section 301 can be constituted by a controller, a control circuit or control apparatus that can be described based on general understanding of the technical field to which the present invention pertains.

The transmission signal generation section 302 generates DL signals (including DL data channels, DL control channels, DL reference signals and so on) as commanded from the control section 301, and outputs these signals to the mapping section 303. To be more specific, the transmission signal generation section 303 performs encoding, rate matching, puncturing, modulation and so on, as commanded from the control section 301. The transmission signal generation section 302 can be constituted by a signal generator, a signal generation circuit or signal generation apparatus that can be described based on general understanding of the technical field to which the present invention pertains.

The mapping section 303 maps the DL signals generated in the transmission signal generation section 302 to predetermined radio resources as commanded from the control section 301, and outputs these to the transmitting/receiving sections 103. The mapping section 303 can be constituted by a mapper, a mapping circuit or mapping apparatus that can be described based on general understanding of the technical field to which the present invention pertains.

Based on commands from the control section 301, the received signal processing section 304 performs receiving processes (for example, demapping, demodulation, decoding and so on) for UL signals transmitted from the user terminals 20 (including, for example, UL data channels, UL control channels, UL reference signals and so on).

The measurement section 305 conducts measurements with respect to the received signals. The measurement section 305 can be constituted by a measurer, a measurement circuit or measurement apparatus that can be described based on general understanding of the technical field to which the present invention pertains.

(User Terminal)

Figure 28:
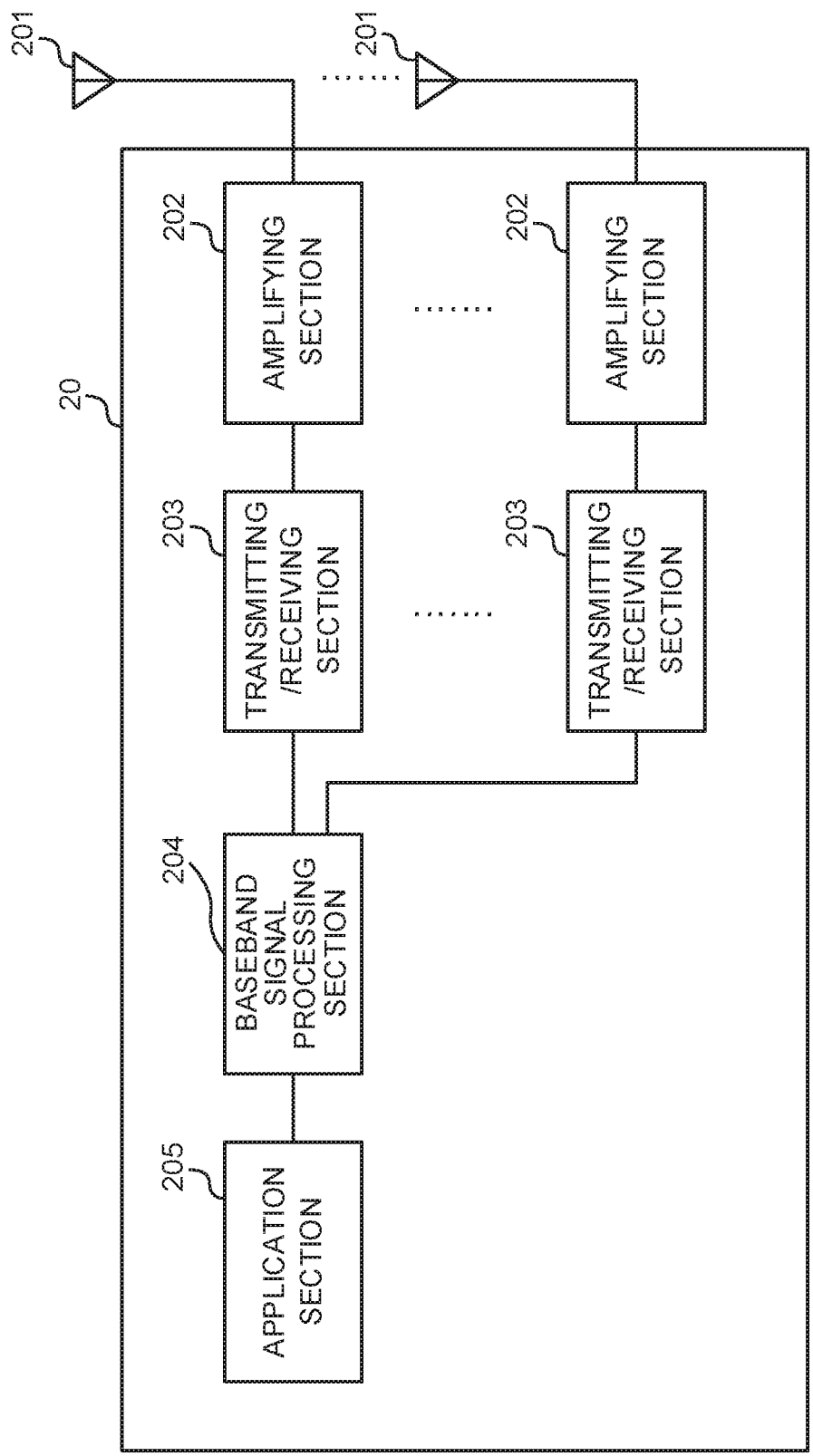
FIG. 28 is a diagram to show an example of an overall structure of a user terminal according to the present embodiment.

FIG. 28 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (for example, DL retransmission control information, channel state information, etc.) is also subjected to channel encoding, rate matching, puncturing, DFT process, IFFT process and so on, and transferred to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 transmit and/or receive a control channel, and a data channel that is at least time-division-multiplexed with the control channel. To be more specific, the transmitting/receiving sections 203 receive a DL control channel, and a DL data channel that is at least time-division-multiplexed with the DL control channel (first aspect). Here, the DL control channel may be mapped to candidate resources in a search space (DL control channel candidates).

In addition, the transmitting/receiving sections 203 transmit a UL control channel, and a UL data channel that is at least time-division-multiplexed with the UL control channel (second aspect). Here, the UL control channel may be mapped to candidate resources (UL control channel candidate) in a search space (UE-based approach), or may be mapped to resources (UL control channel resources) that are determined explicitly or implicitly (NW-based approach).

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 29:
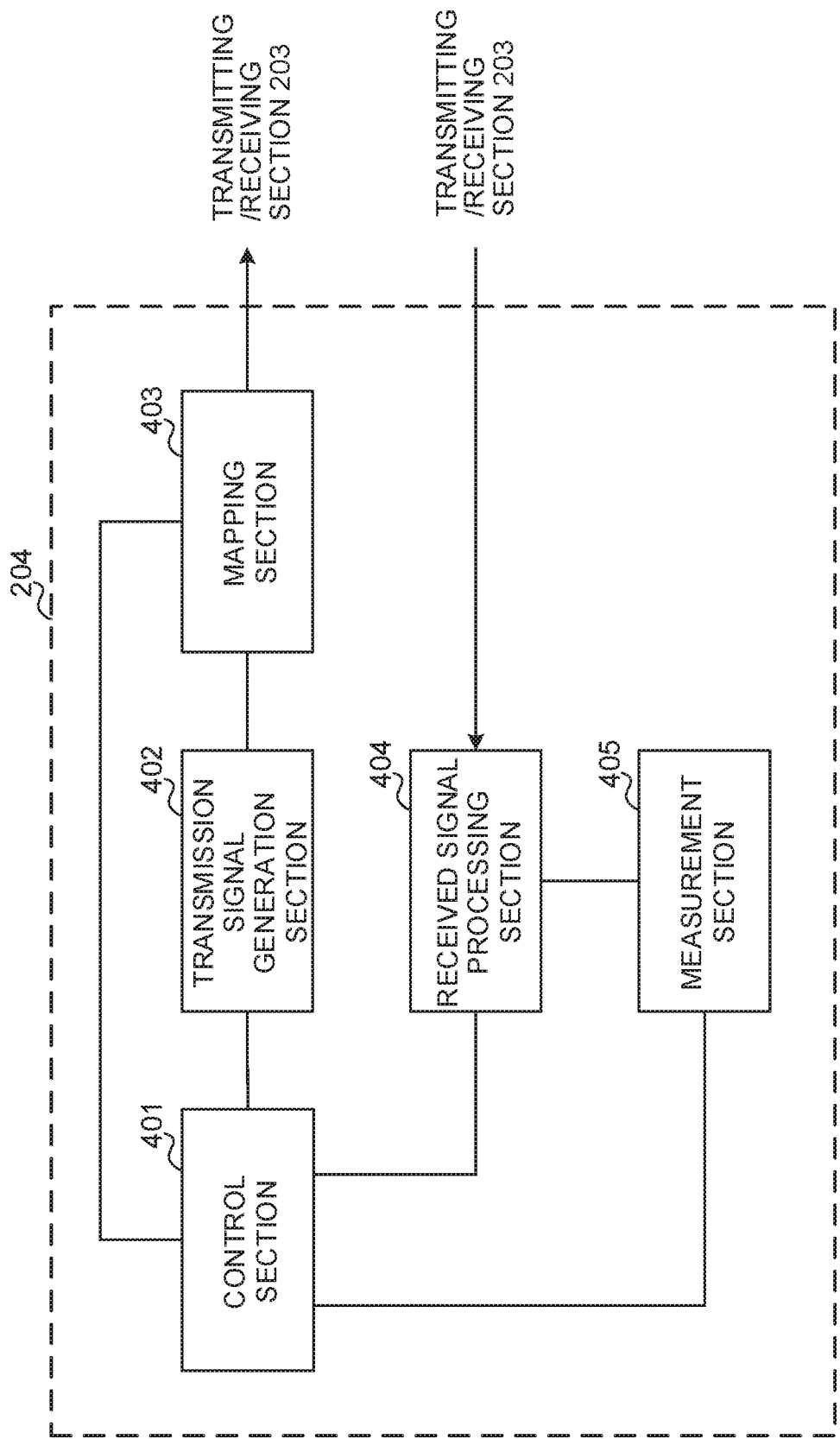
FIG. 29 is a diagram to show an example of a functional structure of a user terminal according to the present embodiment.

FIG. 29 is a diagram to show an example of a functional structure of a user terminal according to the present embodiment. Note that, although FIG. 29 primarily shows functional blocks that pertain to characteristic parts of the present embodiment, the user terminal 20 has other functional blocks that are necessary for radio communication as well. As shown in FIG. 29, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, generation of UL signals in the transmission signal generation section 402, mapping of UL signals in the mapping section 403, DL signal receiving processes in the received signal processing section 404, and measurements in the measurement section 405.

The control section 401 also controls transmission and/or receipt of a data channel based on at least one candidate resource in a control channel's search space. To be more specific, the control section 401 may control receipt of a DL data channel based on at least one candidate resource (DL control channel candidate) in the search space for a DL control channel (first aspect).

For example, the control section 401 may assume that the DL data channel is not mapped to a predetermined number X of symbols at the top of a TTI (the first mapping control according to the first aspect). The control section 401 may assume that the DL data channel is not mapped in a symbol that contains the above at least one candidate resource (DL control channel candidate) (the second mapping control according to the first aspect).

Alternatively, the control section 401 may assume that, even in a symbol where the above at least one candidate resource is included, the DL data channel is mapped to frequency resources, which are included in frequency resources scheduled for the DL data channel, and in which the above at least one candidate resource is not included (the third mapping control according to the first aspect).

Alternatively, the control section 401 may assume that, even in a symbol where the above at least one candidate resource is included, the DL data channel is mapped to frequency resources, which are included in frequency resources scheduled for the DL data channel, and to which no DL control channel is mapped (the fourth mapping control according to the first aspect).

Furthermore, the control section 401 may control transmission of a UL data channel based on UL control channel resources, which are specified in an explicit or implicit manner (NW-based approach), or based on at least one candidate resource (UL control channel candidate) in a search space for a UL control channel (UE-based approach) (second aspect).

For example, the control section 401 does not have to map the UL data channel to a predetermined number X of symbols at the top of a TTI (the first mapping control according to the second aspect). In a symbol that contains this UL control channel resource (NW-based approach), or in a symbol where the above at least one candidate resource (UL control channel candidate) is included (UE-based approach), the control section 401 does not have to map the UL data channel (the second mapping control according to the first aspect).

Alternatively, even in a symbol where the above at least one candidate resource is included (UE-based approach), the control section 401 may map the UL data channel to frequency resources, which are included in frequency resources scheduled for the UL data channel, and in which the above at least one candidate resource is not included (the fourth mapping control according to the second aspect).

Alternatively, even in a symbol where the above UL control channel resource is included (NW-based approach), or in a symbol where the above at least one candidate resource is included (UE-based approach), the control section 401 may map the UL data channel to frequency resources, which are included in frequency resources scheduled for the UL data channel, and to which no UL control channel is mapped (the third mapping control according to the second aspect).

The control section 401 can be constituted by a controller, a control circuit or control apparatus that can be described based on general understanding of the technical field to which the present invention pertains.

The transmission signal generation section 402 generates UL signals (including UL data channels, UL control channels, UL reference signals and so on) as commanded from the control section 401 (including performing coding, rate matching, puncturing, modulation and so on), and outputs these signals to the mapping section 403. The transmission signal generation section 402 can be constituted by a signal generator, a signal generation circuit or signal generation apparatus that can be described based on general understanding of the technical field to which the present invention pertains.

The mapping section 403 maps the UL signals generated in the transmission signal generation section 402 to radio resources as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) for DL signals transmitted from the user terminals 20 (including, for example, DL data channels, DL control channels, DL reference signals and so on). The received signal processing section 404 outputs the information received from the radio base station 10, to the control section 401. For example, the received signal processing section 404 outputs broadcast information, system information, higher layer control information that is provided through higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that channel states may be measured on a per CC basis.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 30:
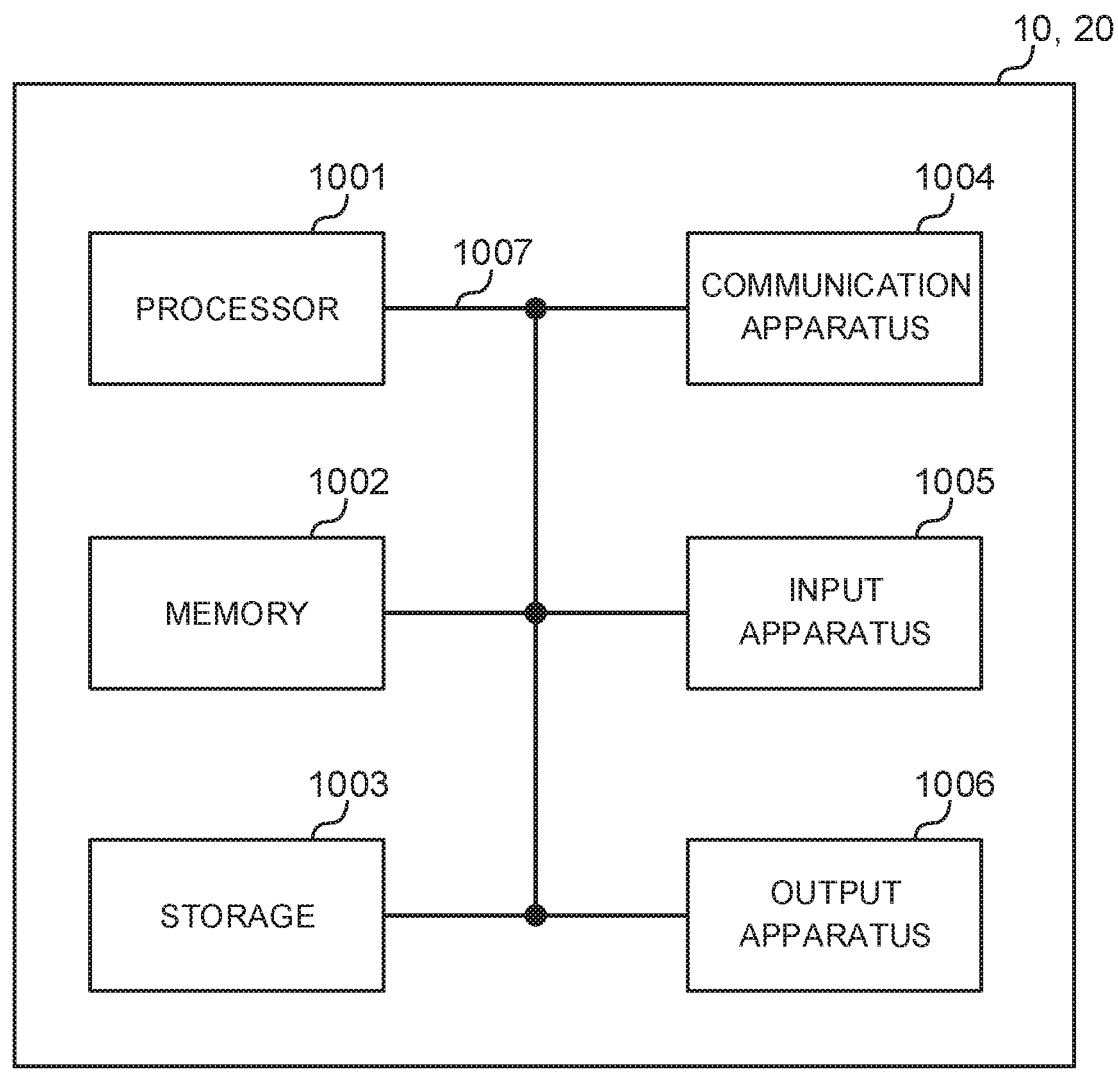
FIG. 30 is a diagram to show an example hardware structure of a radio base station and a user terminal according to the present embodiment.

That is, a radio base station, a user terminal and so on according to embodiments of the present invention may function as a computer that executes the processes of the radio communication method of the present invention. FIG. 30 is a diagram to show an example hardware structure of a radio base station and a user terminal according to the present embodiment. Physically, the above-described radio base stations 10 and user terminals 20 may be formed as computer apparatus that includes a processor 1001, a memory 1002, a storage 1003, communication apparatus 1004, input apparatus 1005, output apparatus 1006, a bus 1007 and so on.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a plurality of processors may be provided. Furthermore, processes may be implemented with one processor, or processes may be implemented simultaneously, in sequence, or in different manners, on one or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by controlling the processor 1001 to do calculations, the communication apparatus 1004 to communicate, and the memory 1002 and the storage 1003 to read and/or write data.

The processor 1001 may control the whole computer by, for example, running an operating system. The processor 1001 may be formed with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be comprised of a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, codes, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a number of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-150066, filed on Jul. 29, 2016, including the specification, drawings and abstract, is incorporated herein by reference in its entirety.

The invention claimed is:

1. A terminal comprising:
a receiver that receives a physical downlink control channel (PDCCH) that schedules a physical downlink shared channel (PDSCH); and
a processor that, when the scheduled PDSCH overlaps a candidate resource for the PDCCH, assumes that the scheduled PDSCH is not mapped to the overlapping candidate resource in which the PDCCH is detected,
wherein the PDCCH is allowed to be mapped to a predetermined number of symbols at a beginning of a slot,
the slot is configured with 14 symbols,
the PDCCH and the scheduled PDSCH are allowed to be mapped to a same symbol, and
the predetermined number is configured through higher layer signaling.

2. The terminal according to claim 1, wherein when the scheduled PDSCH overlaps a candidate resource for the PDCCH, the processor assumes that the scheduled PDSCH is mapped to the overlapping candidate resource in which the PDCCH is not detected.

3. The terminal according to claim 1, wherein the PDCCH is not placed over a whole system band.

4. A radio communication method for a terminal, comprising:
receiving a physical downlink control channel (PDCCH) that schedules a physical downlink shared channel (PDSCH); and
when the scheduled PDSCH overlaps a candidate resource for the PDCCH, assuming that the scheduled PDSCH is not mapped to the overlapping candidate resource in which the PDCCH is detected,
wherein the PDCCH is allowed to be mapped to a predetermined number of symbols at a beginning of a slot,
the slot is configured with 14 symbols,
the PDCCH and the scheduled PDSCH are allowed to be mapped to a same symbol, and
the predetermined number is configured through higher layer signaling.

5. A base station comprising:
a transmitter that transmits a physical downlink control channel (PDCCH) that schedules a physical downlink shared channel (PDSCH); and
a processor that that controls not to map the scheduled PDSCH to a candidate resource of the PDCCH,
wherein the PDCCH is allowed to be mapped to a predetermined number of symbols at a beginning of a slot,
the slot is configured with 14 symbols,
the PDCCH and the scheduled PDSCH are allowed to be mapped to a same symbol, and
the predetermined number is configured through higher layer signaling.

6. A system comprising a base station and a terminal, wherein:
the base station comprises:
a transmitter that transmits a physical downlink control channel (PDCCH) that schedules a physical downlink shared channel (PDSCH); and
a first processor that that controls not to map the scheduled PDSCH to a candidate resource of the PDCCH, the terminal comprises:
a receiver that receives the PDCCH that schedules the PDSCH; and
a second processor that, when the scheduled PDSCH overlaps a candidate resource for the PDCCH, assumes that the scheduled PDSCH is not mapped to the overlapping candidate resource in which the PDCCH is detected,
wherein the PDCCH is allowed to be mapped to a predetermined number of symbols at a beginning of a slot,
the slot is configured with 14 symbols,
the PDCCH and the scheduled PDSCH are allowed to be mapped to a same symbol, and
the predetermined number is configured through higher layer signaling.

* * * * *